United States Patent
Pack et al.

(10) Patent No.: US 8,452,448 B2
(45) Date of Patent: May 28, 2013

(54) ROBOTICS SYSTEMS

(75) Inventors: Robert T. Pack, Nashua, NH (US);
Marshall J. Vale, Arlington, MA (US);
Justin H. Kearns, Cambridge, MA (US)

(73) Assignee: iRobot Corporation, Bedford, MA (US)

( * ) Notice: Subject to any disclaimer, the term of this patent is extended or adjusted under 35 U.S.C. 154(b) by 1393 days.

(21) Appl. No.: 12/100,782

(22) Filed: Apr. 10, 2008

(65) Prior Publication Data
US 2009/0254217 A1   Oct. 8, 2009

Related U.S. Application Data

(60) Provisional application No. 61/041,707, filed on Apr. 2, 2008.

(51) Int. Cl.
*G05B 19/04* (2006.01)
*G05B 19/18* (2006.01)

(52) U.S. Cl.
USPC .......... 700/246; 700/245; 700/248; 700/250; 700/253; 700/255; 700/258; 700/259; 700/260; 700/261; 700/262

(58) Field of Classification Search
None
See application file for complete search history.

(56) References Cited

U.S. PATENT DOCUMENTS

| | | | |
|---|---|---|---|
| 6,636,781 B1 * | 10/2003 | Shen et al. | 700/248 |
| 6,763,282 B2 * | 7/2004 | Glenn et al. | 700/245 |
| 6,810,118 B1 * | 10/2004 | Martin | 379/221.08 |
| 6,820,032 B2 * | 11/2004 | Wenzel et al. | 702/167 |
| 6,909,801 B2 * | 6/2005 | Wenzel et al. | 382/152 |
| 6,917,710 B2 * | 7/2005 | Rajagopal et al. | 382/195 |
| 6,944,331 B2 * | 9/2005 | Schmidt et al. | 382/165 |
| 6,950,552 B2 * | 9/2005 | Nair et al. | 382/195 |
| 6,959,104 B2 * | 10/2005 | Rajagopal et al. | 382/107 |
| 7,034,831 B2 * | 4/2006 | Wenzel et al. | 345/442 |
| 7,035,694 B2 * | 4/2006 | Ramamoorthy et al. | 700/18 |
| 7,117,186 B2 * | 10/2006 | Koza et al. | 706/13 |
| 7,348,963 B2 * | 3/2008 | Bell | 345/156 |
| 2002/0102018 A1 * | 8/2002 | Lin et al. | 382/165 |
| 2002/0135578 A1 * | 9/2002 | Wenzel et al. | 345/442 |
| 2002/0140700 A1 * | 10/2002 | Wenzel et al. | 345/442 |
| 2002/0141645 A1 * | 10/2002 | Rajagopal et al. | 382/195 |

(Continued)

OTHER PUBLICATIONS

International Search Report and Written Opinion in connection with International Application No. PCT/US2008/059856 dated Jun. 19, 2009, 69 pages.

(Continued)

*Primary Examiner* — Ian Jen
(74) *Attorney, Agent, or Firm* — Fish & Richardson P.C.

(57) ABSTRACT

A method of controlling a robot includes running multiple applications on a processor, where each application has a robot controller and an action selection engine. Each application is in communication with at least one behavior and at least one action model of at least part of the robot. The method includes running periodic action selection cycles on each action selection engine. Each action selection cycle includes selecting a command for each action space of each action model, generating a single overall command based on the accumulated commands for each action model, and sending the overall command to the robot controller for execution on the robot.

22 Claims, 23 Drawing Sheets

U.S. PATENT DOCUMENTS

| | | | |
|---|---|---|---|
| 2002/0146152 A1* | 10/2002 | Rajagopal et al. | 382/107 |
| 2002/0146172 A1* | 10/2002 | Nair et al. | 382/195 |
| 2002/0147568 A1* | 10/2002 | Wenzel et al. | 702/167 |
| 2003/0023348 A1* | 1/2003 | Inoue et al. | 700/245 |
| 2003/0045203 A1* | 3/2003 | Sabe et al. | 446/356 |
| 2004/0030414 A1* | 2/2004 | Koza et al. | 700/1 |
| 2004/0243281 A1* | 12/2004 | Fujita et al. | 700/245 |
| 2006/0041332 A1* | 2/2006 | Sabe et al. | 700/245 |
| 2006/0069863 A1* | 3/2006 | Palmer et al. | 711/114 |
| 2006/0184482 A1* | 8/2006 | Flinn et al. | 706/45 |
| 2007/0237396 A1* | 10/2007 | Wenzel et al. | 382/209 |
| 2007/0299802 A1* | 12/2007 | Kwok | 706/52 |

OTHER PUBLICATIONS

Neves, Maria C. and Eugenio Oliveria. "A Control Architecture for an Autonomous Mobile Robot". Proceedings of the $1^{st}$ International Conference of Autonomous Agents. Feb. 7, 1997. pp. 193-200.

Pack, Robert T. "Chapter 2: Software architecture for intelligent robotics". IMA: The Intelligent Machine Architecture, 1998. pp. 15-52.

International Examination Report dated Jul. 12, 2010 from corresponding application PCT/US2008/059856.

* cited by examiner

ROBOTICS SYSTEMS

CROSS REFERENCE TO RELATED APPLICATIONS

This U.S. patent application claims priority under 35 U.S.C. §119(e) to U.S. Provisional Application 61/041,707, filed on Apr. 2, 2008. The disclosure of the prior application is considered part of and are hereby incorporated by reference in the disclosure of this application.

TECHNICAL FIELD

This disclosure relates to robotics systems.

BACKGROUND

Behavior based robotics systems grew out of a reactive approach to robot control in order to compensate for limitations (lack of state and inability to look into the past or the future) while conserving its strengths (real time responsiveness, scalability, and robustness). In the last decade, behavior based systems have proven themselves as one of the two favored general methodologies (the other being hybrid systems) for autonomous system control and as the most popular methodology for physical multi robot system coordination. Effective behavior selection or arbitration is a key challenge in behavior based control, as it determines which behavior or subset of behaviors controls the robot at a given time. Current systems run behaviors serially, but face myriad issues when given the task of running multiple behaviors at once that require overlapping resources of the robot.

SUMMARY

Effective action selection and control arbitration are critical elements to providing high quality behavior based control for robot systems. The system designed must provide coherency of action across many different applications, while providing coordination between many competing goals, obstacles, and physical constraints in a robot system. These mechanisms work together to determine which behavior (or subset of behaviors) controls the robot at a given time. Current systems for behavioral control fail to simultaneously provide coherency and coordination and they fail to scale up to the large numbers of actuators in modern robot systems (often 10 or more DOF).

The robotics system disclosed is designed to be a low-overhead in-process component API system. The robotics system may include a base framework that is the basis of all other frameworks in a robot and defines how other internal interfaces are defined, as well as how to build software modules from reusable units. The base framework provides the necessary infrastructure for principled, medium-grained software composition of dynamically loaded and configured binary objects within a single process. This feature is included to support the construction of extensible (plug-in or add-on) software components of significant internal complexity. The features of the base framework are intended to address the needs of complexity management, scaling of system size and dynamic software composition at runtime for interfaces.

The robotics system described herein provides two levels of application structure and are used to cleanly separate roles and responsibilities in the software design of behavior based robots. The robotics system includes a control arbitration layer that allows multiple applications to simultaneously share control of robot actuators in a prioritized fashion. The control arbitration layer provide coherency of robot actuator (resource) access across the set of applications. The control arbitration layer of the robotics system allows multiple applications to start and stop dynamically at runtime and supports the principled sharing of robot resources (actuators) between different applications based on a user-specified priority ordering between those applications.

The robotics system also includes an action selection layer that allows a hierarchical collection of behaviors within an application to collaboratively generate a coordinated output command for very large numbers of degrees of freedom (large number of actuators). The action selection layer allows multiple behaviors to collaborate by evaluating possible outcomes from known feasible robot commands that respect the dynamic limits of the robot system actuators. Behaviors evaluate trajectories of future actuation states, called outcomes, and provide evaluations of the outcomes. Action models are used to provide the feasible set of commands, provide a search heuristic for a specific set of actuators, and to simulate the effects of a command forward in time. To reduce the complexity of the search space within the action selection system, the entire set of resources (actuators) on the robot is split in to an ordered collection of sub-spaces which are searched for the best available, feasible command independently. The behaviors themselves are intended to implement separable portions of the total cognizance of the robot and are often broken down based on a user-level problem description, where one behavior (or one group of behaviors) is assigned to each task within the user-level description of the robot's overall mission.

The action selection layer also provides an integrated event dispatching loop which is used by outside components of the robot system to coordinate the hierarchical collection of behaviors. The event dispatching and handling elements of the action selection layer can be used to enable/disable behaviors and action model elements, switch the modes or states within a behavior or any other application defined purpose. The key value of the approach is that this event handling and dispatch are integrated with the basic behavior application programming interface (API) to simplify the construction of behaviors.

In one aspect, a method of controlling a robot includes running multiple applications on a processor, where each application has a robot controller and an action selection engine. Each application is in communication with at least one behavior and at least one action model of at least part of the robot. The method includes running periodic action selection cycles on each action selection engine. Each action selection cycle includes selecting a command for each action space of each action model, generating a single overall command based on the accumulated commands for each action space, and sending the overall command to the robot controller for execution on the robot. One advantage of the action selection engine is its ability to generate an overall command for the robot that is composed of commands for every action space of the robot.

Implementations of this aspect of the disclosure may include one or more of the following features. The action selection cycle, in some examples, includes three phases: nomination, action selection search, and completion. In the nomination phase, each action model and each behavior are informed of the system state and of the start of the action selection cycle. In the action selection search phase, the action selection engine uses action models to generate feasible commands and simulated outcomes in each of the action spaces (space of available actions). The action selection engine may make multiple calls to evaluation functions while searching for the best possible outcome in the time available for the cycle. The action models generate the feasible commands and corresponding resulting future outcomes that are evaluated by the behaviors. The action selection engine accumulates the outcome evaluations provided by the behaviors for each action space and selects the best outcome and corresponding command for each action space. The action selection engine then generates the overall command for all the robot resources by combining the selected command in each, separate action space. In the completion phase, the action selection engine sends the overall command to the connected robot controller for execution and sends the overall outcome to all active behaviors and behavior policies as feedback on the cycle (allowing behavior policies to adapt, if possible).

In some implementations, the action selection cycle includes obtaining a system state from the robot controller, informing each action model and each behavior of the system state, and informing each action model and each behavior of the start of the action selection cycle. Selecting a command for each action space, in some examples, includes calling the corresponding action model to generate feasible commands for the action space, calling the corresponding action model to generate outcomes for the feasible commands, calling each behavior to evaluate and provide an outcome evaluation for each outcome, accumulating the outcome evaluations of each behavior, selecting a winning outcome for the action space, and selecting the command corresponding to the winning outcome. The method may include implementing an application priority policy that determines which application has exclusive control of resources of the robot required by that application at a given time. The application priority policy may be implemented by a robot manager in communication with each robot controller.

In another aspect, a method of generating a command for a robot controller includes calling at least one action model having at least one action space to generate feasible commands for each action space, calling each action model to generate an outcome for each command, and sending each outcome to at least one behavior for evaluation. Each behavior provides an outcome evaluation for each outcome. The method includes selecting a winning outcome for each action space based on the at least one outcome evaluation, selecting the command corresponding to the winning outcome for each action space, generating a single overall command based on the accumulated commands for each action space, and sending the overall command to the robot controller. Multiple behaviors in communication with the action selection engine can collaborate by evaluating outcomes simulated by the action models for feasible robot commands that respect the dynamic limits of the robot system actuators. In some implementations, the method includes obtaining a system state from the robot controller and informing each action model and each behavior of the system state.

Implementations of the above two aspects of the disclosure may include one or more of the following features. In some implementations, calling the action model to generate feasible commands for an action space includes generating a randomized set of commands based on a previously selected command of the robot system and limited to a feasible spread from a current state by the dynamic actuator limits (acceleration, velocity, torque, etc.). In examples where the action model heuristic generates commands around a previously selected command, the action selection engine may use the set of randomly generated feasible commands to execute a hill-climbing randomized search. The search may include a search technique utilizing a command history of the action space and/or be a randomized search based on a current command.

Preferably, each action model is sequentially called in a predetermined order and each action space within each action model is sequentially called in a predetermined order. The winning outcomes of any preceding action spaces are considered when selecting the winning outcome for each action space. The outcome evaluations can be weighted according to weights associated with each behavior. The method, in some examples, includes generating an overall outcome for the overall command, and sending the overall outcome to each behavior as feedback.

In yet another aspect, a robotics system includes multiple robot resources, a control arbiter for each robot resource, and multiple applications in communication with the control arbiters. Each control arbiter controls its associated robot resources. Each application includes a robot controller in communication with the control arbiters, an action selection engine in communication with robot controller, at least one behavior in communication with the action selection engine, and at least one action model in communication with the action selection engine. The action selection engine periodically executes an action selection cycle to generate an overall command which is sent to the robot controller for execution on the robot resources. Each action model models at least one of the robot resources and has at least one action space. A robot manager communicates with the applications and the control arbiters. The robot manager implements an application priority policy for determining which application has exclusive control of any one or more of the robot resources at a given time. The action selection cycle includes selecting a command for each action space of each action model, generating the single overall command based on the accumulated commands for each action space, and sending the overall command to the robot controller.

Implementations of this aspect of the disclosure may include one or more of the following features. In some implementations, each action model is independently removable from the robotics system and communicates with the action selection engine through an action model application programming interface. The action model application programming interface includes a get action spaces function configured to provide a resource and outcome state space structure of the action model. In some examples, the action model application programming interface includes a begin cycle function configured to begin the action selection cycle, a generate commands function configured to generate commands for a given action space, a simulate command function configured to simulate outcomes for given commands, and a notify command function configured to notify the action model of a command chosen for a particular action space.

In some implementations, each behavior is independently removable from the robotics system and communicates with the action selection engine through a behavior application programming interface. The behavior application programming interface includes an initialization function configured to initialize the behavior for use, a begin cycle function configured to begin the action selection cycle, an evaluate function configured to evaluate a collection of outcomes, and an end cycle function configured to notify the respective behavior that the action selection cycle is complete.

In some implementations, the action selection cycle includes obtaining a system state from the robot controller, informing each action model and each behavior of the system state, and informing each action model and each behavior of the start of the action selection cycle.

In some examples, selecting a command for each action space includes calling the corresponding action model to generate feasible commands for the action space, calling the corresponding action model to generate outcomes for the feasible commands, calling each behavior to evaluate and provide an outcome evaluation for each outcome, accumulating the outcome evaluations of each behavior, selecting a winning outcome for the action space, and selecting the command corresponding to the winning outcome. The robotics system preferably includes a publish-subscribe system configured to provide asynchronous messaging between each robot controller, each control arbiter, and the robot manager.

In another aspect, a robotics system includes multiple robot resources, a control arbiter for each robot resource, and multiple applications in communication with the control arbiters. Each control arbiter controls its associated robot resource. Each application includes a robot controller in communication with the control arbiters and an action selection engine in communication with the robot controller. A robot manager communicates with the applications and the control arbiters to implement an application priority policy for determining which application has exclusive control of robot resources required by that application at a given time. The action selection engine executes a heuristic search on each action space of each action model, which models one or more of the robot resources, to identify feasible commands. Each action model provides an outcome for each command. The action selection engine selects one of the commands for each action space based on the outcome evaluations provided by each behavior in communication with the action selection engine. The action selection engine generates an overall command for execution by the robot controller on the robot resources, through the control arbiters, based on the commands selected for each action space.

Implementations of this aspect of the disclosure may include one or more of the following features. In some implementations, the action selection engine accumulates the outcome evaluations for each action space and selects a winning outcome for each action space. The action selection engine selects a command corresponding to the winning outcome for each action space. The action model may provide the heuristic search. Preferably, the action selection engine sequentially processes each action model in a predetermined order and each action space within each action model in a predetermined order. The action selection engine select a command for each action space by selecting a corresponding winning outcome based on the outcome evaluations. The outcome evaluations are weighted according to weights associated with each behavior. The action selection engine may use the winning outcomes of any preceding action spaces when selecting the winning outcome for each action space. The action selection engine generates an overall outcome for the overall command and sends the overall outcome to each behavior as feedback.

In another aspect, an action selection system for robotics control includes one or more action models, one or more behaviors, and one or more action selection engines. Each action model includes at least one action space model defining a simulated state propagation for commands for a physical resource, a command generating routine that generates a predetermined limited number of feasible commands for the physical resource, and a command simulating routine that generates simulated outcomes using a simulated state propagation of a corresponding action space model. Each simulated outcome corresponds to one feasible command. Each behavior includes a routine for collecting sensor data and a routine assigning scores to simulated outcomes using an evaluation routine that considers sensor data, current resource state data, and predetermined goals associated with the behavior. Each action selection engine includes a routine for sequentially obtaining simulated outcomes from each action space model of each action model object, providing the simulated outcomes to each behavior object for assigning scores, weighting the scores according to a predetermined weighting among behavior objects, comparing the weighted scores to determine one winning outcome for each action space model, and then sending the one feasible command corresponding to the one winning outcome for each action space model to the physical resource corresponding to that one feasible command, one winning outcome, and one action space model.

Implementations of this aspect of the disclosure may include one or more of the following features. In some implementations, the command generating routine generates commands throughout the action space model, and the command simulating routine generates simulated outcomes from commands distributed throughout the action space model. Preferably, the command generating routine generates random commands throughout the action space model. In other implementations, the command generating routine generates commands in proximity to a current command in the action space model, and the command simulating routine generates simulated outcomes from commands distributed in proximity to a current command in the action space model. Preferably, the command generating routine generates random commands in proximity to a current command in the action space model. In some implementations, the command generating routine generates commands in proximity to one or more previous commands in the action space model and the command simulating routine generates simulated outcomes from commands distributed in proximity to one or more previous commands in the action space model. Preferably, the command generating routine generates random commands in proximity to one or more previous commands in the action space model.

In another aspect, an action selection engine for robotics control includes a routine for sequentially (i) obtaining simulated outcomes from an action space model of an action model object associated with the action selection engine and (ii) providing the simulated outcomes to behavior objects associated with the action selection engine. The associated action model objects are characterized by at least one action space model defining a simulated state propagation for commands for a physical resource, a command generating routine that generates a predetermined limited number of feasible commands for the physical resource, and a command simulating routine that generates simulated outcomes, each simulated outcome corresponding to one feasible command, using a simulated state propagation of a corresponding action space model. The associated behavior objects are characterized by a routine for collecting sensor data and a routine assigning scores to simulated outcomes using an evaluation routine that considers sensor data, current resource state data, and predetermined goals associated with the behavior. The routine also includes (iii) weighting the scores according to a predetermined weighting among behavior objects, (iv) comparing the weighted scores to determine one winning outcome for each action space model, and then (v) sending the one feasible command corresponding to the one winning outcome for each action space model to the physical resource corresponding to that one feasible command, one winning outcome, and one action space model.

In another aspect, a behavior for robotics control includes (i) a routine that collects sensor data, and (ii) a routine that receives a set of simulated outcomes from a connected object, assigns scores to the simulated outcomes using an evaluation routine that considers sensor data, current resource state data, a cascade of previously determined winning outcomes from earlier cycles, and predetermined goals associated with the behavior. Each simulated outcome in the set is provided as a simulated state propagation corresponding to one feasible command for a physical resource.

In another aspect, an action model for robotics control includes (i) at least one action space model defining a simulated state propagation for commands for a physical resource, (ii) a command generating routine that generates a predetermined limited number of feasible commands for the physical resource, (iii) a command simulating routine that generates simulated outcomes using a simulated state propagation of a corresponding action space model, and (iv) a routine that responds to messages from a connected object to provide at least a set of simulated outcomes for each action space model of each action model object. Each simulated outcome corresponds to one feasible command. In some examples, the action model application programming interface includes an event handler function configured to handle events.

The details of one or more implementations of the disclosure are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The present disclosure provides a robotics system that allows separately written and independently deployed programs or applications to run concurrently on and simultaneously control a robot. The independently deployed applications are combined dynamically at runtime and need to be able to share resources of the robot. A low-level policy is implemented for dynamically sharing the robot resources among the applications at run-time. The policy determines which application has control of the robot resources required by that application (e.g. a priority hierarchy among the applications). Applications can start and stop dynamically and run completely independently of each other. The robotics system also allows for complex behaviors which can be combined together to assist each other.

Figure 1:
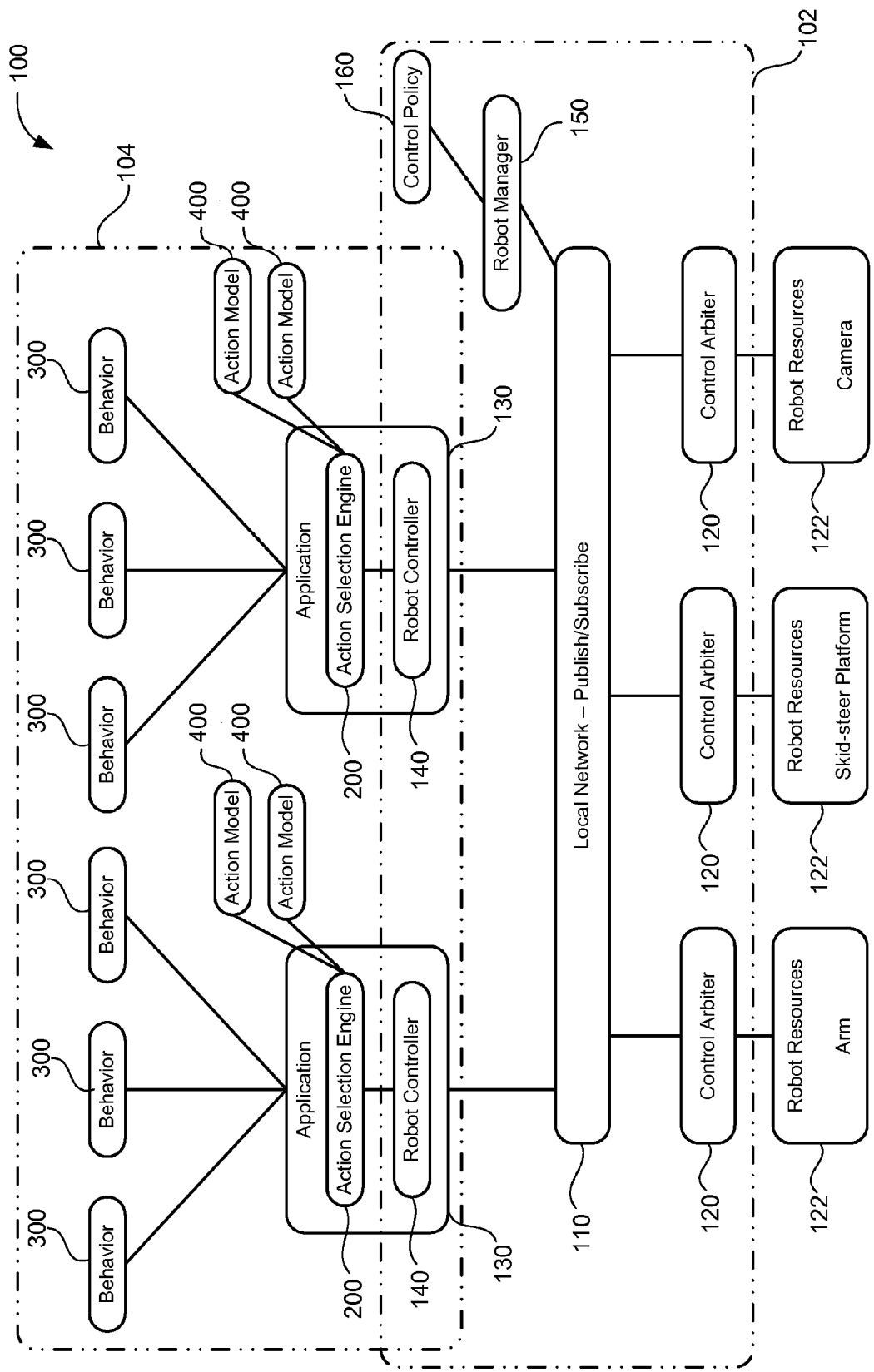
FIG. 1 is a schematic view of a robotics system.

Referring to FIG. 1, a robotics system 100 includes a control arbitration system 102 and a behavior system 104 in communication with each other. The control arbitration system 102 allows applications 130 to be dynamically added and removed from the robotics system 100, and facilitates allowing applications 130 to each control the robot without needing to know about any other applications 130. In other words, the control arbitration system 102 provides a simple prioritized control mechanism between applications 130 and the resources 122 of the robotics system 100. The control arbitration system includes one or more robot controllers 140, a robot manager 150, and one or more control arbiters 120. These components do not need to be in a common process or computer, and do not need to be started in any particular order. This capability allows for different modules (e.g. payloads) with self contained computing power to be plugged into the robotics systems 100, as well as the ability to plug in a small piece of robot brain providing different capabilities to the overall robotics system 100, while using the same actuator space.

The robot controller 140 component provides an interface to the control arbitration system 102 for applications 130. There is an instance of this component for every application 130. The robot controller 140 abstracts and encapsulates away the complexities of authentication, distributed resource control arbiters, command buffering, and the like.

The robot manager 150 coordinates the prioritization of applications 130, by controlling which application 130 has exclusive control of any of the robot resources 122 at any particular time. Since this is the central coordinator of information, there is only one instance of the robot manager 150 per robot. The robot manager 150 implements a priority policy 260, which has a linear prioritized order of the robot controllers 140, and keeps track of the resource control arbiters 120 that provide hardware control.

The control arbiter 120 receives the commands from every application 130 and generates a single command based on the applications' priorities and publishes it for its associated resources 122. The control arbiter 120 also receives state feedback from its associated resources 122 and sends it back up to the applications 130. Robot resources 122 may be a network of functional modules (e.g. actuators, drive systems, and groups thereof) with one or more hardware controllers. Each resource 122 has a control arbiter 120 that issues commands to that resource 122. The robot resources 122 are pluggable and may be dynamically added or removed from the robot system 100 and its network 110 at run-time. The commands of the control arbiter 120 are specific to its resource 122 to carry out specific actions.

Still referring to FIG. 1, the robotics system 100 for a robot (not shown) includes a network 110 that provides intra-process communication for the control arbitration system 102 via a real-time publish/subscribe system. Publish/subscribe (or pub/sub) is an asynchronous messaging paradigm where senders (publishers) of messages are not programmed to send their messages to specific receivers (subscribers). Rather, published messages are characterized into classes, without knowledge of what (if any) subscribers there may be. Subscribers express interest in one or more classes, and only receive messages that are of interest, without knowledge of what (if any) publishers there are. This decoupling of publishers and subscribers can allow for greater scalability and a more dynamic network topology. A publication provides a mechanism for updating a specific data item in a distributed database, so that the value will be propagated to all interested parties (the "subscribers") without the publication client having any knowledge of subscribers. A subscription provides a mechanism for accessing a specific data item from a distributed database, without knowledge of the exact source of that data item (the "publisher"). For example, behaviors 300 can collect sensor information published to the publish/subscribe system on the local network 110. In another example, the robot controllers 140 can publish commands 440 to shared memory of the pub/sub system on the local network 110 that is accessed by control arbiters 120 to pull the commands 440 in any particular order. Preferably, the control arbiters 120 pull the commands 440 according to a published priority policy 160.

In the pub/sub model, subscribers typically receive only a sub-set of the total messages published. The process of selecting messages for reception and processing is called filtering. There are two common forms of filtering: topic-based and content-based. In a topic-based system, messages are published to "topics" or named logical channels. Subscribers in a topic-based system will receive all messages published to the topics to which they subscribe, and all subscribers to a topic will receive the same messages. The publisher is responsible for defining the classes of messages to which subscribers can subscribe. In a content-based system, messages are only delivered to a subscriber if the attributes or content of those messages match constraints defined by the subscriber. The subscriber is responsible for classifying the messages. Either type of filtering may be used, or even a combination of the two.

The robotics system 100 can use any form of conventional "real-time publish/subscribe" or its equivalent, including "real-time distributed publish/subscribe", e.g., Data Distribution Service5 (DDS) for Real-Time Systems standard from Object Modeling Group (OMG), or NDDS implementation commercially available from Real-Time Innovations, or open-source OCERA ORTE, or Real Time Publish Subscribe (RTPS) from Interface for Distributed Automation (IDA), or proprietary or purpose built solutions. In preferred implementations of the robotics system 100, the publications and subscriptions are named instances and can be created, managed, used, and connected just like any other component in the system. Adding a communications endpoint is a matter of instantiating a publication or subscription and providing parameters. Client code can then use simple write/read APIs for asynchronously sending strongly typed data between multiple threads, processes, or computer systems. The Publish/Subscribe middleware implementation uses type export interfaces provided by a type system as part of a data transport implementation. The basic concept of the Publish/Subscribe system is a distributed, shared memory space where the slots in this distributed shared memory on the local network 110 support late binding and are strongly typed. There is also network reflection of the state between each machine so that the Publish/Subscribe metaphor is maintained across a network of computers.

The Publish/Subscribe uses shared memory as the mechanism for transporting data between publishers and subscribers on the same machine. UDP Multicast is used for networking updates between machines. Publishers always write into shared memory, with cross-network propagation handled by the implementation. Subscribers are unaware of the fact that a published value might be coming from a different machine, other than the obvious change in update latency relative to locally available data. Publications and subscriptions are named instances. Usable publications and subscriptions include two objects, one in the program using them, and an associated endpoint in shared memory. Endpoints are referred to by name, and may be either "public" or "private". If a publication or subscription has a public endpoint, the name of the endpoint is the pathname of the publication or subscription. The name of a private endpoint is automatically constructed when the endpoint is created, and is guaranteed to be unique. Because of this named endpoint model, the Publish/Subscribe is a topic-based system, though with each topic having a specific value type. There are strong requirements on the latency and locking behaviors of this inter-process communications mechanism in order to permit fast sharing of many disparate pieces of state between processes on the same machine. In particular, an attempt to publish a value by writing to a publication should not be blocked by a concurrent write to a different publication, nor by a concurrent update of any subscription, whether it is subscribed to the publication being written to or not.

A server program (the Publish/Subscribe Registry Server) is responsible for creating and initializing the shared memory. It provides network services for registering and removing endpoints and connections between them, and for obtaining information about the set of registered endpoints and connections. These network services include establishing connections between publications one machine and subscriptions on other machines, and arranging for locally published data to be sent over the network to remote subscriptions.

A subscription must explicitly request a value update, obtaining the current value from the connected publication endpoint in shared memory. This permits the client owning the subscription to explicitly control when value updates occur, rather than requiring it to deal with asynchronous arrival of new data. Publish/Subscribe also supports waiting for a subscription to have a new value available. This involves attempting to obtain new data from the connected publication, and if the most recently published data is the same (by timestamp) as for the previous subscription update, then the update attempt will wait until the publisher writes a new value. This allows an application to "poll" for new values without either taking up excessive system resources or having large latencies between new values becoming available and their being noticed. Subscriptions may also be created as part of a subscription group. A subscription group provides a convenient mechanism for updating several subscriptions at once. This is a common use-case in periodic threads, for example, with each periodic action consisting of updating several subscriptions and then processing all of them. Subscription groups also support waiting for any of the subscriptions to have a new value, providing select-like behavior on multiple data sources.

Each publication or subscription has an associated value type. This value type is specified when the publication or subscription is created, and specifies the type of data that may be written to or received by the object. This type also specifies the value type for the associated endpoint, and a subscription may only be connected to a publication with the same value type. To be publishable, such a value type must be "exportable," as specified by a Type system. Among other things, this requires that the type supports being written to a boost serialization archive. The Publish/Subscribe uses the binary archives from the boost serialization library to encode the data being written to shared memory by a publisher, and to decode that data for subscribers. This transport through shared memory is further optimized when the type in question is "fast exportable".

Figure 2:
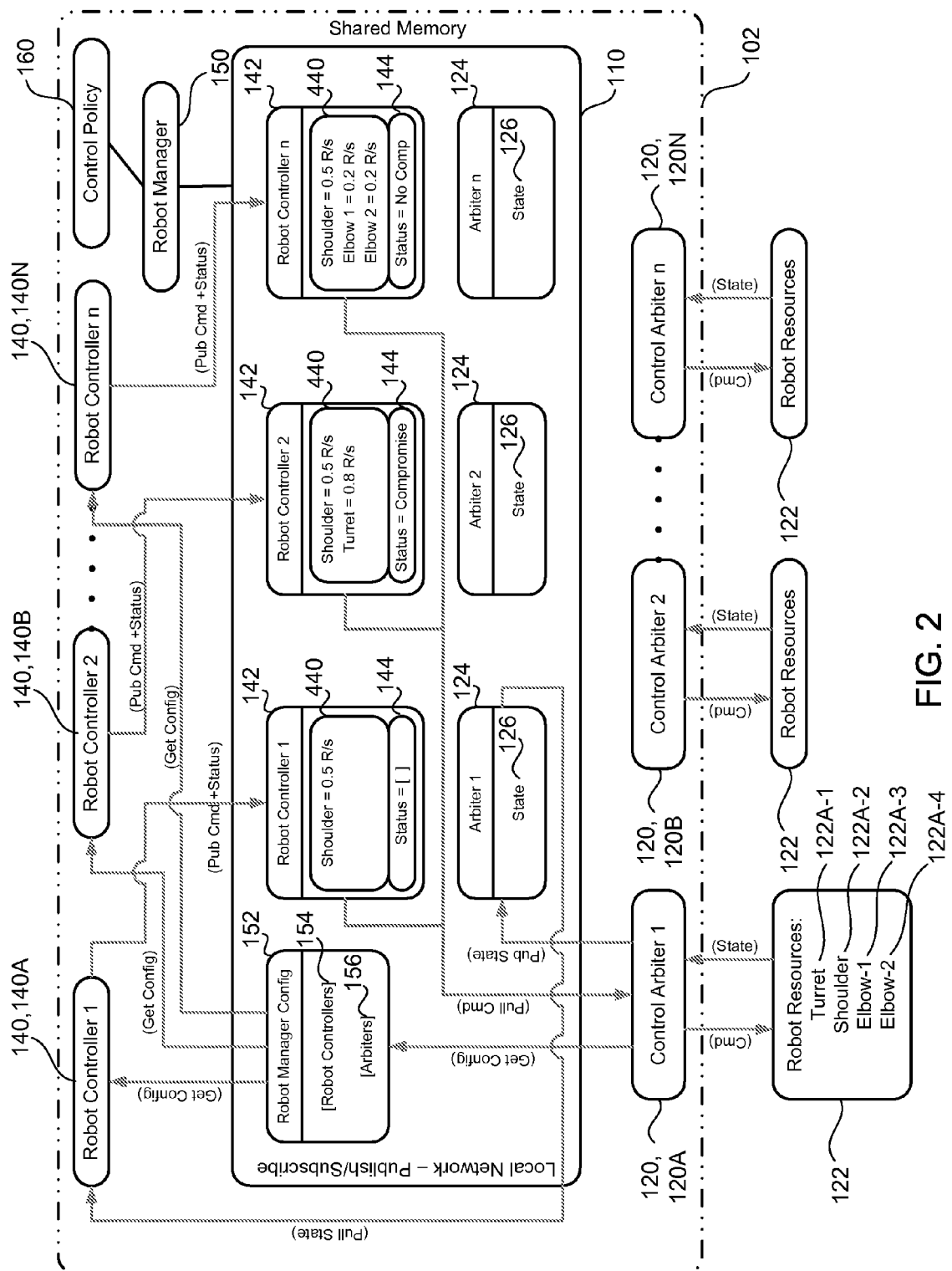
FIG. 2 is a schematic view of a control arbitration system.

FIG. 2 provides an example of a control arbitration process on the control arbitration system 102. The robot manager 150 has a robot manager configuration 152 stored in shared memory (e.g. for the pub/sub system) of the local network 110 that implements the control policy 160. The robot manager configuration 152 stores a user defined robot controller list 154 of all the robot controllers 140 (e.g. by name) and a user defined control arbiter list 156 of all the control arbiters 120 (e.g. by name) available within the robotics system 100. The robot controller list 154 and the control arbiter list 156 may be ordered by a user or automatically by a system process to provide a linear prioritization of the robot controllers 140 and the arbiters 120. Every robot controller 140 itemized in the robot controller list 154 has a corresponding robot controller memory block 142 in the shared memory of the local network 110. Similarly, every control arbiter 120 itemized in the control arbiter list 156 has a corresponding control arbiter memory block 124 in the shared memory of the local network 110. The robot controllers 140 each communicate with the robot manager configuration 152 to learn of all the control arbiters 120 available to receive commands in the robotics system 100 by getting the control arbiter list 156. Each robot controller 140 publishes a command 440 and a status 144 to its corresponding robot controller memory block 142. The publication of the command 440 and status 144 causes a change in the state of the shared memory via the publish/subscribe system. Each control arbiter 120 wakes up in response to the shared memory change.

Each control arbiter 120 communicates with the robot manager configuration 152 to learn of all the robot controllers 140 in the robotics system 100 by getting the robot controller list 154, and pulls the commands 440 and statuses 144 from all the robot controller memory blocks 142. Each control arbiter 120 sequentially pulls the command 440 and status 144 from each robot controller memory block 142 in the order defined by the robot controller list 154, and, depending on the robot controller status 144, issues the command 440 to one or more of the uncommitted connected resources 120 (e.g. hardware) of that control arbiter 120. Each robot controller 140 has a status 144 of compromising or non-compromising. With a status 144 of compromising, the robot controller 140 is willing to allow issuance of a partial command 440. In contrast, with a status 144 of non-compromising, the robot controller 140 is will only allow issuance of a full command 440.

For example, referring to FIG. 2, the first control arbiter 120A controls an arm resource 122 having a turret, shoulder, elbow-1, and elbow-2. The robot controllers 140 become informed of the first control arbiter 120A through the nth control arbiter 120N by getting the control arbiter list 156 from the robot manager configuration 152. Each active robot controller 140 receives a command 440 from the behavior system 102 for execution by the control arbitration system 102 and publishes its command 440 its respective robot controller memory block 142. The control arbiters 120 recognize that one or more commands 440 have been published and sequentially pull the commands 440 for execution. The first control arbiter 120A (as designated so by the control arbiter list 156) pulls the command 440 and status 144 of the first robot controller 140A (as designated so by the robot controller list 154) from the respective robot controller memory block 142, which, in this case, contains a command 440 for the shoulder resource 122A-2. The status 144 of the first robot controller 140A is irrelevant because none of the resources 120 have been committed yet. The first control arbiter 120A commits the shoulder resource 122A-2 to the command 440 of the first robot controller 140A.

Next, the first control arbiter 120A pulls the command 440 and status 144 of the second robot controller 140B from the respective robot controller memory block 142, which, in this case, contains a command 440 for the shoulder resource 122A-2 and the turret resource 122A-1 and a status of compromising. Since the shoulder resource 122A-2 was committed to the first robot controller 140A, the first control arbiter 120A will be unable to issue the full command 440 of the second robot controller 140B. Nevertheless, since the second robot controller 140B has a status of compromising, the first control arbiter 120A will be able to issue the command 440 partially, by committing the currently uncommitted turret resource 122A-1 for the command 440 of the second robot controller 140B. The first control arbiter 120A proceeds to sequentially pull the command 440 and status 144 of each successive robot controller 140 in the robot controller list 154 and commit resources 122 in accordance with the status 144 of the respective robot controller 140.

In the example of nth robot controller 140N, the first control arbiter 120A pulls its command 440 and status 144 from the respective robot controller memory block 142, which, in this case, contains a command 440 for the shoulder resource 122A-2, the elbow-1 resource 122A-3 and the elbow-2 resource 122A-4, and a status of non-compromising. Since the shoulder resource 122A-2 was committed to the first robot controller 140A, the first control arbiter 120A will be unable to issue the full command 440 of the nth robot controller 140N. Furthermore, since the nth robot controller 140N has a status of non-compromising, the first control arbiter 120A will be unable to issue the command 440 partially to the uncommitted elbow-1 and elbow-2 resources 122A-3, 122A-4. As a result, the first control arbiter 120A commits no resources 122 for the command 440 from the nth robot controller 140N. The command 440 from the nth robot controller 140N will unit for another cycle when all of the required resources 122 are uncommitted and available.

The first control arbiter 120A continues to step through each robot controller 140 until all of its connected resources 122 are committed. Once all of the connected resources 122 are committed, the control arbiter 120 sends a coherent command to its resources 122 and updates its corresponding control arbiter memory block 124 with state feedback 126 of the resources 122. Each robot controller 140 can pull the state feedback 126 (e.g. asynchronously) of each control arbiter 120 from the corresponding control arbiter memory block 124.

Figure 3:
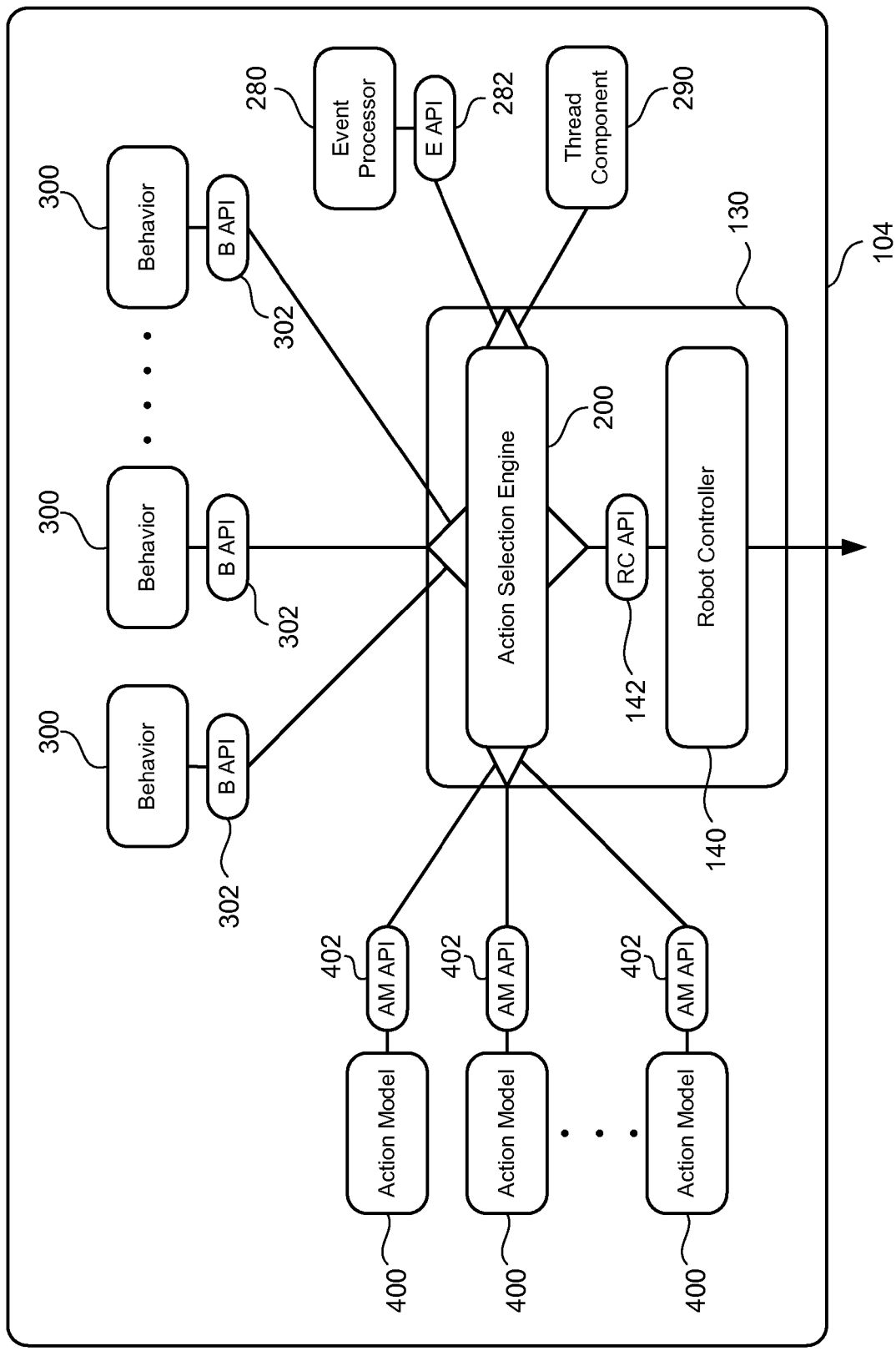
FIG. 3 is a schematic view of a behavior system.

Referring to FIGS. 1 and 3, the behavior system 104 includes at least one application 130. Each application 130 has an action selection engine 200 and a robot controller 140, one or more behaviors 300 connected to the action selection engine 200, and one or more action models 400 connected to action selection engine 200. The behavior system 104 provides predictive modeling and allows the behaviors 300 to collaboratively decide on the robot's actions by evaluating possible outcomes, which will be described later. A behavior 300 is a plug-in component that provides an evaluation function that can be based on an internal state machine, a coupling of sensory feedback from multiple sources to outcomes 450, or a combination of the evaluation functions of other behaviors 300 in a subsequent layer. This allows behaviors 300 to nest hierarchically and form a layered hierarchical and statefull evaluation function that maps sensory feedback to outcomes 450 differently in different situations. Since the behaviors 300 are pluggable into the application 130, they can be removed and added without having to modify the application 130 or any other part of the robotics system 100.

The action selection engine 200 communicates with the robot controller 140 through the robot controller application programming interface (API) 142, a behavior 300 through a behavior API 302, and an action model 400 through an action model API 402. Abstraction and encapsulation of each component 140, 300, 400 is accomplished through their respective API 142, 302, 402, which provides a manner in which compliant components 140, 300, 400 communicate with the action selection engine 200.

An example interface for the behavior API 302 is provided in Table 1 below. A behavior that is capable of communicating with the API communicates using some or all of the functions and data structures as follows.

TABLE 1

| Public Member Functions (Behavior) | Description |
|---|---|
| void init (const ActionSpaceVector &actionSpaces) | Initialize the resource setup for this behavior. Initialize: the "init" function has as an argument/variable "actionSpaces", which is preferably of a type or format "ActionSpaceVector", which represents a list of the available action spaces. Each element of the list is of the type ActionSpace containing: The type of states and resources in this action space. (Axis, Discrete Integer resource, or Discrete Float resources) The total actions per. cycle generated for this space. The name of the model space itself. The names of the commandable resources in the space. |
| beginCycle ( const ChronometerTime tNow, const float tHorizon, const CombinedState &xInit) | This interface function is the channel or reference pointer by which the command and accompanying variables are sent to the behavior 300. Begin an action selection cycle 210. Begin Cycle: the "beginCycle" function has three argument/variables: 1. tNow is a time stamp for the beginning of the cycle (ChronometerTime is a reference clock type) 2. tHorizon is a variable for passing a time interval for an action selection cycle, e.g., 1 second. 3. xInit is a CombinedState type variable which represents the current state of the system resources. It contains: The current state of the system's axis resources, as a MultiAxisState type. Each axis resource is of type AxisState that represents a controlled moving part of the robot that has continuous position. It contains: The current velocity of the resource. The current acceleration of the resource. The current absolute position of the resource. The current incremental position of the resource. The force or torque on the axis. For each of the above fields (velocity, acceleration, position, incremental position, torque) a respective field to represent the uncertainty information about that field. |

TABLE 1-continued

| Public Member Functions (Behavior) | Description |
| --- | --- |
| | Resource limits in terms of minimum/maximum velocity, acceleration, position and torque.<br>Status bits that hold information about the validity of the state. (ex. if the POSITION_INVALID bit is set, it means that the position data for that axis is invalid.)<br>The current state of the system discrete integer resources. The state of each discrete integer resource is provided as an IntState containing:<br>  The value of the state. This data holds in it information about the quality and the validity of the information.<br>  The minimum and maximum value of the state of this |
| void evaluate (<br>    const std::string &space,<br>    const float tHorizon,<br>    const CombinedState &xInit,<br>    const Outcome &defaultOutcome,<br>    const OutcomeVector<br>&outcomeOptions,<br>    UtilityValueVector &evaluations) | Evaluate a collection of outcomes 450.<br>The "evaluate" function packages or points to several argument/variables, which include:<br>tHorizon as noted above.<br>xInit as noted above.<br>"space" is a string specifying the action space that we are asked to evaluate in this round.<br>defaultOutcome is a variable representing the current Default Outcome Set 451, which represents the evolution of states in this and other action spaces 410. The internal structure represents a mapping of resource names to it respective default outcome. This representation is of type Outcome which represents a time-stepped sequence of Combined State that are a discrete-time representation of the Action Model predicted states for actuators. The Outome type contains a data structure (OutcomeSampleVector) that coordinates the time sequence structure and the collection of CombinedState instances to keep predicted information into one coherent structure.<br>outcomeOptions is a variable that represents that list of possible outcomes that are presented to the behavior for evaluation. It contains a number of Outcome (as above) types.<br>evaluations is an array of scores, of UtilityValueVector type or format, which accommodates the scores such that each outcome option will be given a score determining how good it satisfies the behavior's end goal. The utility for each outcome is represented by a UtilityValue type that will hold the score as a value between [−1.0, 1.0]. The &evaluations array is returned by a behavior. |
| void endCycle (<br>    const ChronometerTime tEnd,<br>    const Outcome &finalOutcome,<br>    const float overallScore) | Notify that this action selection cycle 210 is complete.<br>End Cycle: the "endCycle" function packages tEnd, a time stamp for the end of the cycle, finalOutcome, an array of all the winning outcomes, and overallScore which has the actual final combined/weighted score for the outcome that was selected. |

The behaviors 300 are intended to implement a separable portion of the overall cognizance of the robot (e.g. Goto waypoint or avoid collisions). To support coordination of the state machines of all of the behaviors 300, the behavior system 104 provides an event processor 280 (having event handling interface methods) (see FIG. 3), which allows an outside component to post a discrete message which will be reliably transmitted to all behaviors 300 and action models 400 at the same time. A message is posted by pushing an event into an event priority queue, via the action selection engine 200 or directly to behaviors 300, which can receive and post events. Events can be used to turn on and off behaviors 300, set their modes, etc. The queue permits management of the policy for behaviors 300 without processing them individually.

The action model API 402 allows various action models 400 to communicate configuration setup including names of resources, states, and the number of actions generated on each action selection cycle 201 to the action selection engine 200. Action models 400 are event handlers as well, so they can coordinate as necessary with any of the event stream information in the behavior system 104. Example interfaces for the action model API 402 are provided in Tables 2-3 below.

TABLE 2

| Public Member Functions (Action Model) | Description |
|---|---|
| ActionSpaceVector getActionSpaces ( ) const | This function is used to provide clients with the resource and state space structure of an action model by returning one or more of the action spaces 410 to the action model 400. |

Generally, the getActionSpaces function leads to different kinds of Action Models. Because of the diversity of possible action models, a subsidiary set of interfaces is used for particular known varieties of action model, and other types can be introduced. An axis action model interface 402 is used by the action selection engine 200 to provide command/consequence modeling and search guidance heuristics.

TABLE 3

| Public Member Functions (Action Model - Axis) | Description |
|---|---|
| void beginCycle (<br>    const std::string &space,<br>    const ChronometerTime tNow,<br>    const float tHorizon,<br>    const MultiAxisState &xInit__in,<br>    MultiAxisState &xInit__out) | Begin an action selection cycle 210. Begin Cycle: the "beginCycle" function provides an API that informs the start of an Action selection cycle for a given action space. It has several argument/variables, which include: &Space is the name of the action space for this cycle update. This should be one of the spaces returned in getActionSpaces( ) call to this action model.<br>tNow is the start time of this arbitration cycle.<br>tHorizon is the time span for this arbitration cycle. Action models will generate outcomes over this time horizon for evaluation.<br>xInit__in will contain the current state of the actuators in this action space at the start of this cycle, including the limits for each resource.<br>xInit__out will contain the state of the actuators at the beginning of this cycle. It holds the state information in xInit__in as well as augmented states from within the action model. For example a translate/rotate action model can will provide the current state of the Translate and Rotate axis as well as computed odometry information (X, Y, Theta). Both xInit__in and xInit__out will be represented by a MultiAxisState (see above) |
| void generateCommands (<br>    const std::string &space,<br>    const float tHorizon,<br>    const MultiAxisState &xInit,<br>    const MultiAxisCommand &current,<br>    MultiAxisCommandVector &commandOptions,<br>    const std::string &genMode)<br>[OR, e.g., for DiscreteFloatAction Model or DiscreteIntActionModel action models, respectively MultiFloatState or MultiIntState instead of MultiAxisState, MultiFloatCommand or MultiIntCommand | Generate commands 440 for a given starting state and action space 410. Generate Commands: the "generateCommands" function has several argument/variables, which include: space is the name of the action space for this generation operation.<br>tHorizon is the time horizon over which to generate these actions.<br>xInit is the current state for starting the action generation. This is the resulting structure provided by xInit__out in begin cycle. |

TABLE 3-continued

| Public Member Functions (Action Model - Axis) | Description |
|---|---|
| instead of MultiAxisCommand, MultiFloatCommandVector or MultiIntCommandVector instead of MultiAxisCommandVector] | current represents the current command that was applied to the hardware for the resources in that action space. It is represented by a MultiAxisCommand that contains a mapping of resource names to AxisCommand types. An axis command includes: The type of command sent for that resource (ex. VELOCITY command, or POSITION command etc.) The command value. commandOptions is the vector of commands to populate with feasible properly limited commands given the current state and time horizon. Each command option is a MultiAxisCommand (see above descrpition of current argument). As noted, these are essentially the same for stepwise Discrete Float or stepwise Discrete Integer based action models, except that the array definitions (type or format) accommodate appropriate amounts of data to be exchanged. |
| void simulateCommand ( const std::string &space, const MultiAxisState &xInit, const MultiAxisCommand &command, MultiAxisSampleVector &xSteps) [OR, e.g., for DiscreteFloatAction Model or DiscreteIntActionModel action models, respectively as above, or MultiFloatSampleVector or MultiIntSampleVector instead of MultiAxisSampleVector] | Simulate the outcomes 450 of the commands 440 given a state and action space 410. Simulate Commands: the "simulateCommands" function has several argument/variables, which include: Space, &xInit, are as previously described. command is the command to be simulated of MultiAxisCommand type of format (as described before). xSteps is a vector containing the result of simulating the given command from the initial state over this given sample time deltas. Each element in this vector represents a time slice simulation contained in a MultiAxisSample type that holds the time step the resulting simulated state for that time slice. The state is represented as a MultiAxisState. As noted, these are essentially the same for stepwise Discrete Float or stepwise Discrete Integer based action models, except that the array definitions (type or format) accommodate appropriate amounts of data to be exchanged. |
| void notifyCommand ( const std::string &space, const float tHorizon, const MultiAxisCommand &final, float overallUtility) | Inform ActionModel of final command 440 selected for an action spaces 410. Notify Command: the "notifyCommand" function has several argument/variables, which include: space as previously described. tHorizon as previously described. final is an array including the winning commands from the evaluation cycle for that action space. It is of type MultiAxisCommand (described above) overallUtility provides the final score that was given to the outcome that resulted from simulating this command. Essentially the same for stepwise Discrete Float or stepwise Discrete Integer based action models. |

In general, one alternative for expressing similar arrays exchanged under different action model types is Multi[DOF]State, Multi[DOF]Command, Multi[DOF]CommandVector, Multi[DOF]SampleVector, where "DOF" is a degree of freedom.

Referring to FIG. 3, the action selection engine 200 manipulates events all within one thread, so if a behavior 300 were to send an event to the action selection engine 200 when it receives one, it would end up in a loop. To break this loop, there is an event processor 280, which has an event handler API 282 (see FIG. 3). An example interface for the event processor component 280 is shown below in Table 4.

TABLE 4

| Public Functions & Properties (event processor) | Description |
| --- | --- |
| EventProcessor (aware::EventProcessor) Thread (aware::Thread) | Receive events and queue them for processing by the processing thread. Provide access to and control of the processing thread. |
| MaxQueueLength (int = 128) | Maximum number of pending events. An attempt to notify or post a new event when there are already this many events pending will throw an exception. |
| EventHandlers (aware::MultiConnectionVar < aware::EventHandler>) | The set of connected event handlers. |

How events are actually handled is up to the object implementing the event handler API 282. Typically an incoming event is inspected for type, converted to one of several understood event classes using a "narrow( )" operation on an "event" class and then appropriate actions are taken. An example interface for the event handler API 282 is provided in Table 5 below.

TABLE 5

| Public Member Functions (event handler) | Description |
| --- | --- |
| void notify ( const EventHandle &event, ChronometerTime tNow, const EventProcessorHandle &source=0) Called to notify a handler of an event. | This function is called to notify a handler of an event. The event handler is provided with a const event reference to allow it to examine and respond to the event. It is also provided with a handle to the source event handler (if known). If this handle is non-zero, a handler can "post back" events to the event handler which called it using the source event handle. Parameters: [in] event is an event handle referring to an event. [in] tNow is the time the event is being delivered. This is not always the same time as the timestamp of the event. This allows clients to determine the age of the event relative to the current time, deal with delayed events, etc. [in] source is the handle for a source event processor (if any). This handle may be zero. This allows direct post-back of further/future events from within event handler functions. Returns: noting. Throws exceptions on errors. |

The event processor 280 has a queue of events that builds up events when it receives them, and a thread which periodically sends them all out. This makes it possible for a behavior 300 to post a new event while handling an existing one. Each behavior API 302 inherits (and inherits the functions) from the event handler API 282. An event processor component 280 provides demultiplexed forwarding of event objects to a collection of event handler objects. Each event the event processor component 280 receives is queued for forwarding to each of the event handler objects connected to its "event handlers" connection. Events received via a notify( ) function are queued for immediate forwarding, in priority order. There may be multiple queued events if new notifications arrive while some earlier event is still being processed, or if multiple posted events become active at the same time. Events received via a post( ) function are queued for forwarding at the delivery time specified by the call. Once that time is reached, the event is queued for immediate delivery in priority order, along with any other pending events. The actual forwarding of events is performed by an event processing thread owned by the a separate thread component 290. This thread runs whenever there are queued events ready to be forwarded and iterates over the set of connected event handlers, notifying each one of the event. In these notify calls an event processor is passed as the source of the event, for use in callbacks by receiving handlers.

In some implementations, the action selection engine does not contain its own thread. Instead, it uses a separate thread component 290 containing a thread to run it. This allows other components to be hooked up and run at the same rate. The thread component 290 has a periodic thread to trigger action interfaces. Typically the behavior system 104 should be run at 10 Hz or more and the time horizon explored by the system should extend many cycles (often seconds) into the future.

The action selection engine 200 is the coordinating element of the robotics system 100 and runs a fast, optimized action selection cycle 210 (prediction/correction cycle) searching for the best action given the inputs of all the behaviors 300. The action selection engine 200 has three phases: nomination, action selection search, and completion. In the nomination phase, each behavior 300 is notified that the action selection cycle 210 has started and is provided with the cycle start time, the current state, and limits of the robot actuator space. Based on internal policy or external input, each behavior 300 decides whether or not it wants to participate in this action selection cycle 210. During this phase, a list of active behaviors 300 is generated whose input will affect the selection of the commands 440 to be executed on the robot.

In the action selection search phase, the action selection engine 200 generates feasible outcomes 450 from the space of available actions, also referred to as the action space 410. The action selection engine 200 uses the action models 400 to provide a pool of feasible commands 440 (within physical actuator limits like position, velocity and acceleration) and corresponding outcomes 450 predicted to a time horizon in the future. The action models 400 are standalone components connected to the behavior system 104 and represent part of the robot. The action models 400 each model the state propagation of that part of the system, and provide dynamic, adaptive search windows 420 (see FIG. 6) for available actions during the action selection search phase. During the action selection search phase, each active behavior policy 310 is presented the same set of outcome options 450 (simulated by the action models 400). Behaviors 300 are components that implement an evaluation function based on their specified, separable functionality in the robot. This evaluation is reported in the form of a score in the range [−1,1]. The value −1 means the behavior 300 thinks that the proposed outcome 450 is the worst possible outcome for the functionality it represents. The value 1 means the behavior 300 thinks that the proposed outcome 450 is the best possible outcome 450 for the functionality it represents, and a value of 0 means that the behavior 300 doesn't care either way about this outcome 450. The other values are gradations between these extremes.

In the completion phase, the commands 440 that correspond to the collaborative best scored outcome 450 are combined together as an overall command 442, which is presented to the robot controller 140 for execution on the robot resources 122 via their corresponding resource control arbiters 122. The best outcome 450 is provided as feedback to the active behaviors 300, to be used in future evaluation cycles.

Figure 4:
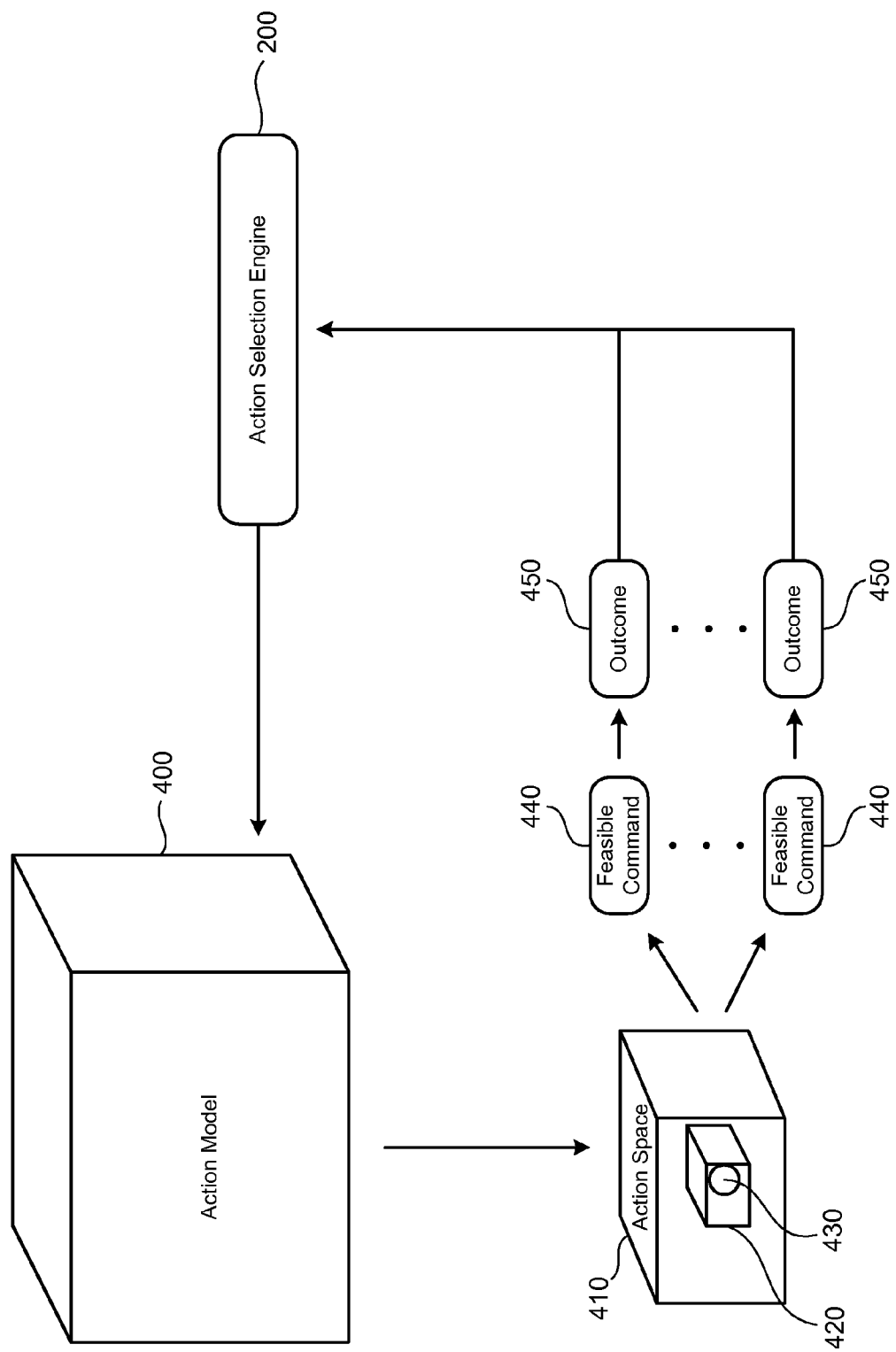
FIG. 4 is a schematic view of an action selection engine calling an action model to generate feasible commands and corresponding outcomes for each action space of the action model.
Figure 5:
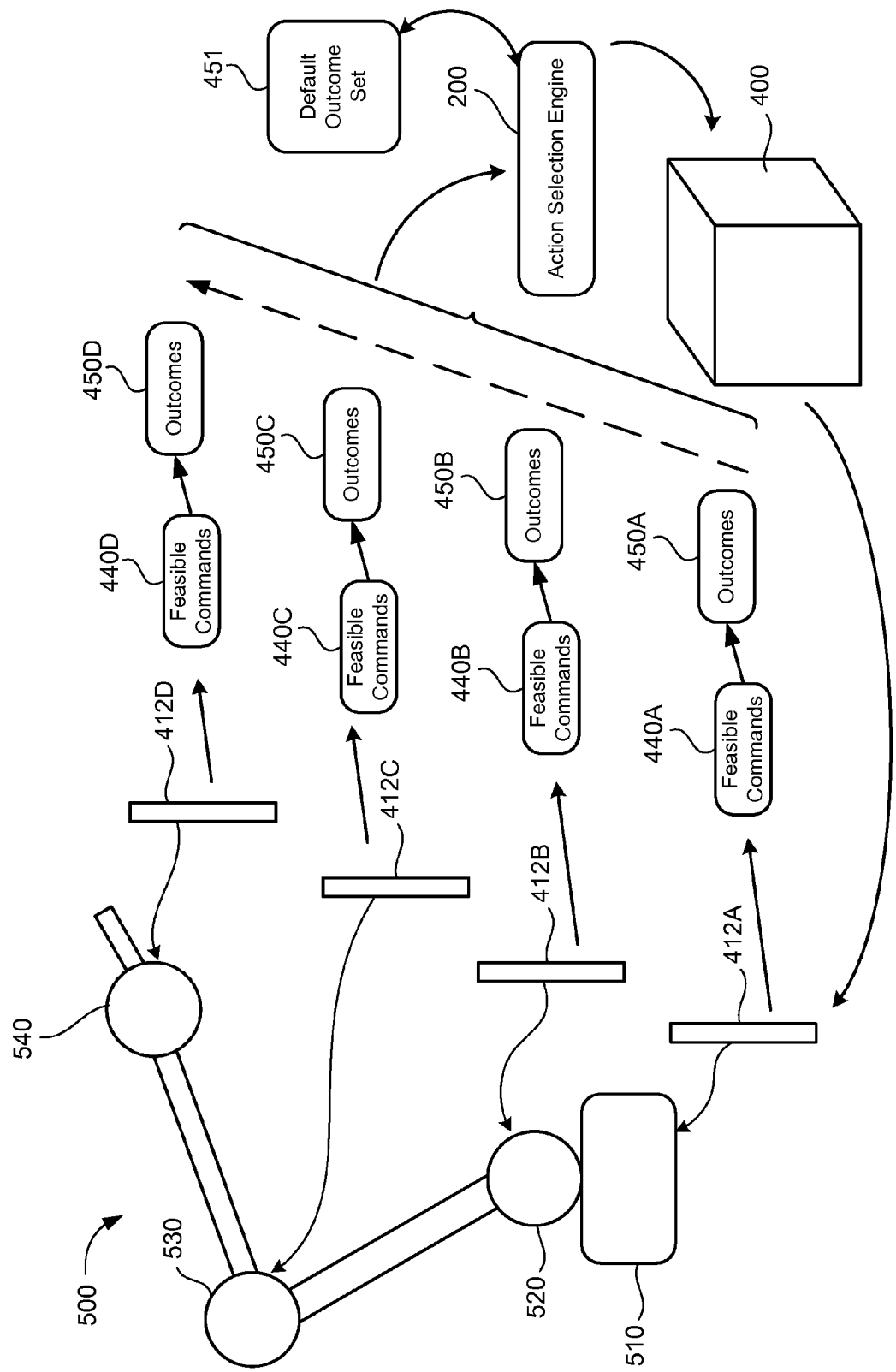
FIG. 5 is a schematic view of an action selection engine calling an action model of an arm to generate feasible commands and corresponding outcomes for each action space of the action model.

Referring to FIGS. 3-5, action models 400 are plug-in components that account for the kinematic and dynamic constraints of all or part of the robot and supports predictions of command outcomes 450 on a local time-horizon. Action models 400 generate possible states that the robot can transition to and create the predicted future outcomes 450. Action models 400 are used or called by the action selection engine 200 to provide feasible commands 440 (by modeling the mechanism) and corresponding expected outcomes 450 (via dynamic modeling) for the robot resources 122, as illustrated in FIG. 4, which are evaluated by the behaviors 300 to find the best action. The action model 400 is responsible for creating a feasible action space 410 of all or part of the robot. To reduce the complexity of the search space, the resources 122 on the robot are separated into smaller action spaces 410 which are independently evaluated.

In the example shown in FIG. 5, an action model 400 of a robots arm 500 having a turret 510, a shoulder 520, an elbow-1 530, and an elbow-2 540 includes a corresponding turret action space 412A, a shoulder action space 412B, elbow-1 action space 412C, and elbow-2 action space 412D. The action selection engine 200 calls the action model 400 of a robots arm 500 to provide sets of feasible commands 440A, 440B, 440C, 440D and corresponding sets of expected sets of outcomes 450A, 450B, 450C, 450D for each action space 412A, 412B, 412C, 412D.

For command generation, the action model 400 takes in the current state of the system resources 122 controlled by an action space 410. Given the current resource states, the dynamic limits of the resources 122, and the time horizon for which to generate commands 440, the action model 400 generates a "dynamic window" 420, which is a range of commands 440 that are feasible. Commands 400 are then selected among this feasible range and within the dynamic window 420 using heuristic choosing mechanisms. These mechanisms can include, but are not limited to: selecting commands 440 from a uniform distribution of feasible commands 440 and selecting commands 440 from an adaptive range around the last commands 443 selected to hill climb toward the command 440 that the behavior system 104 wants to choose, where the range adapts based on the deviation of the previous commands 440 chosen. The goal of command generation is to generate commands 440 achievable by the system hardware 122 in the specified time horizon that result in potential state trajectories that are likely to be evaluated highly by the behaviors 300 in the behavior system 104. The command generation is attempting to guess what the system needs to do based on what it has been doing, while providing random commands 440 in case the system's goals change.

Figure 6A:
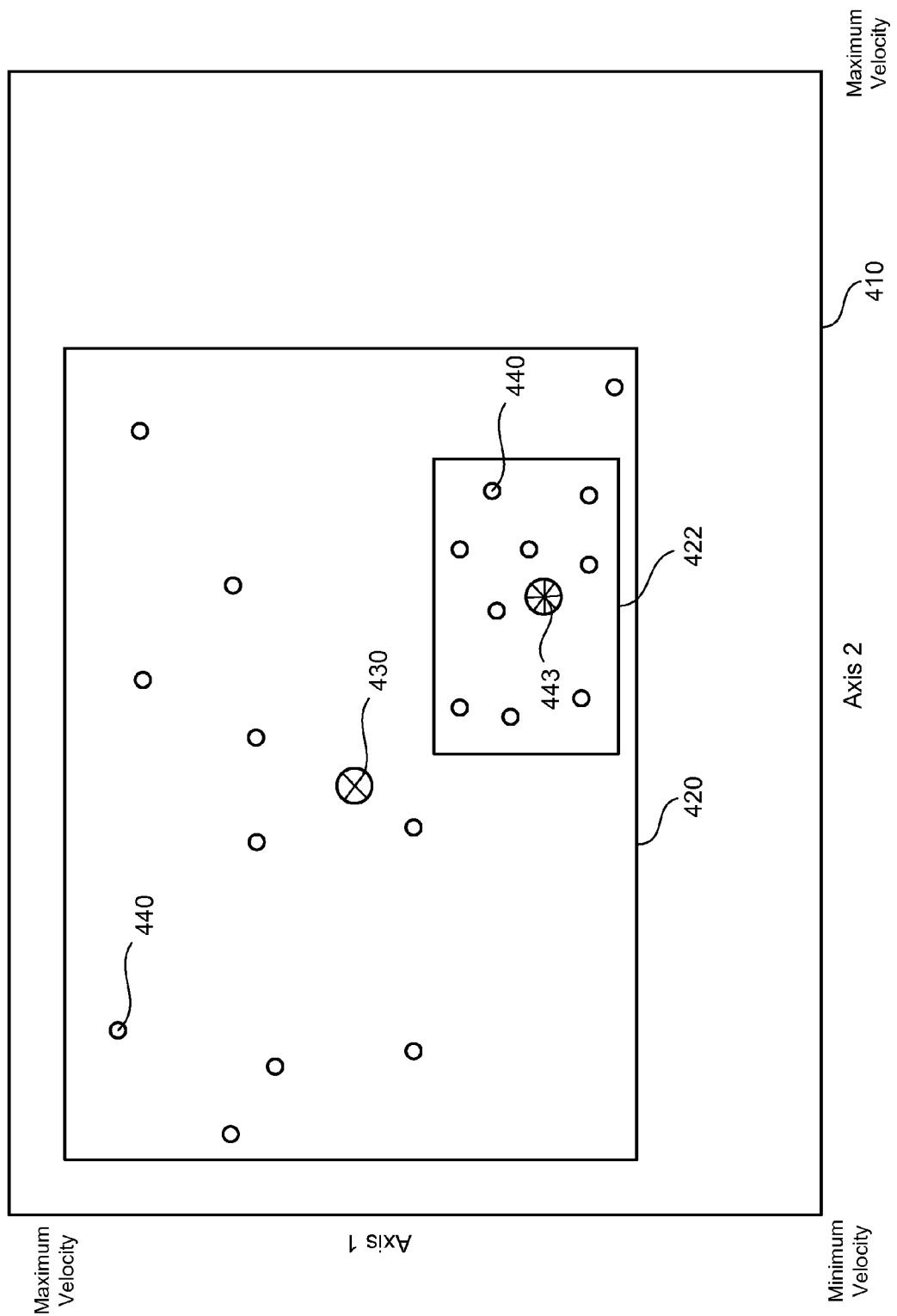
FIG. 6A is a schematic view of a two-axis action space of an action model.

FIG. 6A shows an example of a two-axis action space 410 for axis 1 and axis 2 of an X-Y actuator robot resource 122 (e.g. a drive system). An adaptive window 422 is set around the last know command 443 and the action model 400. The size of the adaptive window 422 may be set by an adaptive window parameter, which may include a command history, a certain number of previous commands 400, and/or a maximum or minimum size centered around the last command 443. The corresponding action model 400 that models the dynamics and kinematics, inter alia, of the X-Y actuator robot resource 122 generates a set of feasible commands 440, in this case 20 commands 440, based on a current command state 430 of the X-Y actuator robot resource 122, the dynamic limits of the X-Y actuator 122, and the time horizon. The current state information includes the position, velocity, and torque, inter alia. The action model 400 generates a certain number of commands 440, in this case ten commands 440, within the adaptive window 422 and another set of explore commands 440, in this case ten more commands 440, outside the adaptive window 422, but within the dynamic window 420. The action selection engine 200 randomly selects a certain number of commands 440 within the dynamic window 420, and within the adaptive window 422, for evaluation by the behaviors 300.

Figure 6B:
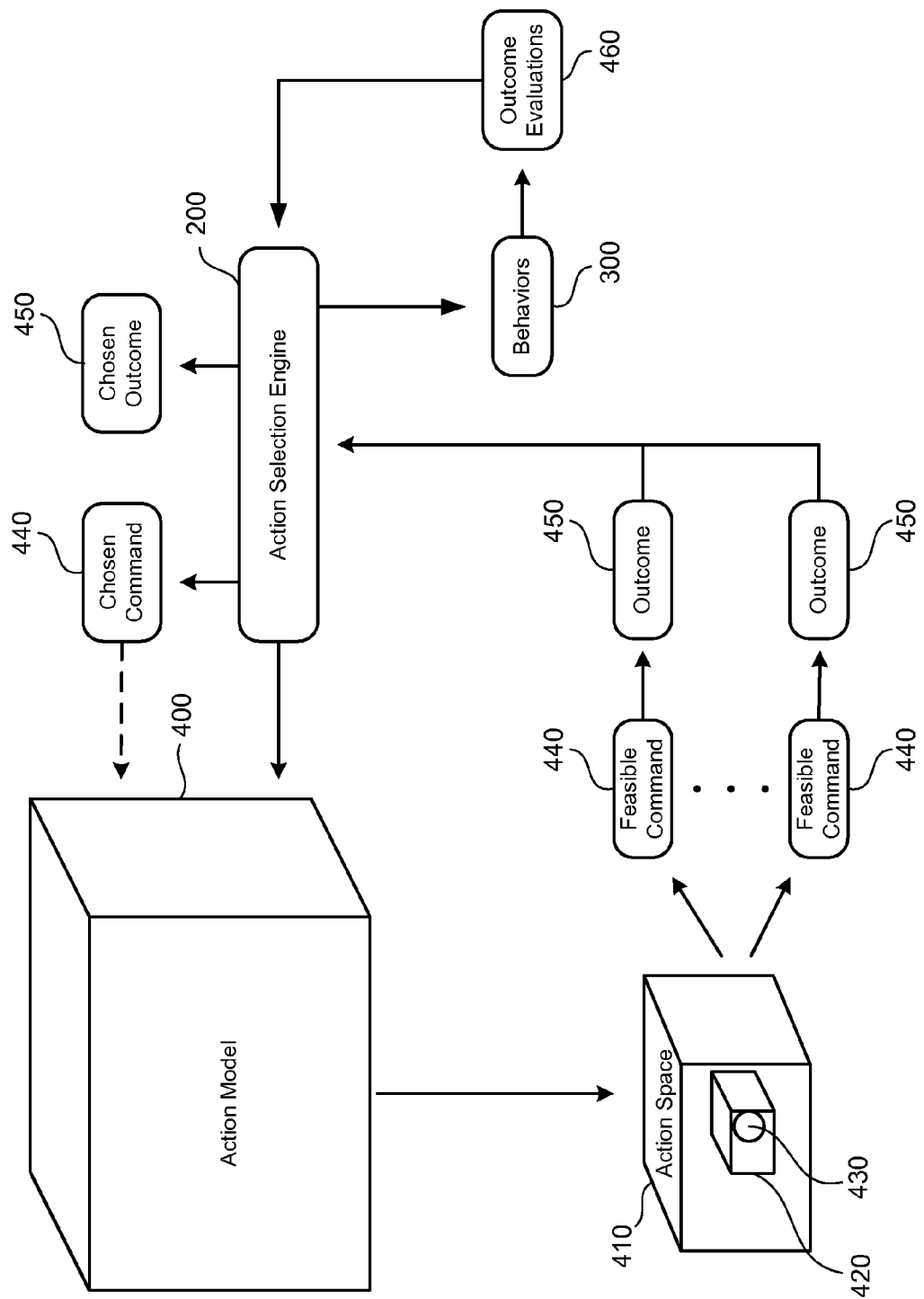
FIG. 6B is a schematic view of an action selection cycle.

Referring to FIG. 6B, the action selection engine 200 executes a randomized search of an action space 410, using the action model 400 for that action space 410 as the means to generate feasible commands 440, provide a search heuristic (e.g. hill-climbing), and to simulate feasible commands 440 into outcomes 450. In the example shown the feasible action space 410 surrounds the current command state 430. The action selection engine 200 uses the action model 400 to predict the expected outcomes 450 of all feasible commands 440 several seconds into the future. When behaviors 300 evaluate these commands 440 (e.g. future system trajectories) based on their expected outcomes 450, they have access to the predicted state evolution over several seconds in the future. The action selection engine 200 calculates a preferred outcome 450, based on the outcome evaluations 450, and sends the corresponding command 400 to the control arbitration system 102 by interfacing with the robot controller 140 of the application 130 to publish commands 440 to the pub/sub system on the network 110, thereby making the commands 440 available to the control arbiters 120 and to receive state feedback 126. The action selection engine 200 also notifies the action model 400 of the chosen commend 440 as feedback.

Figure 6C:
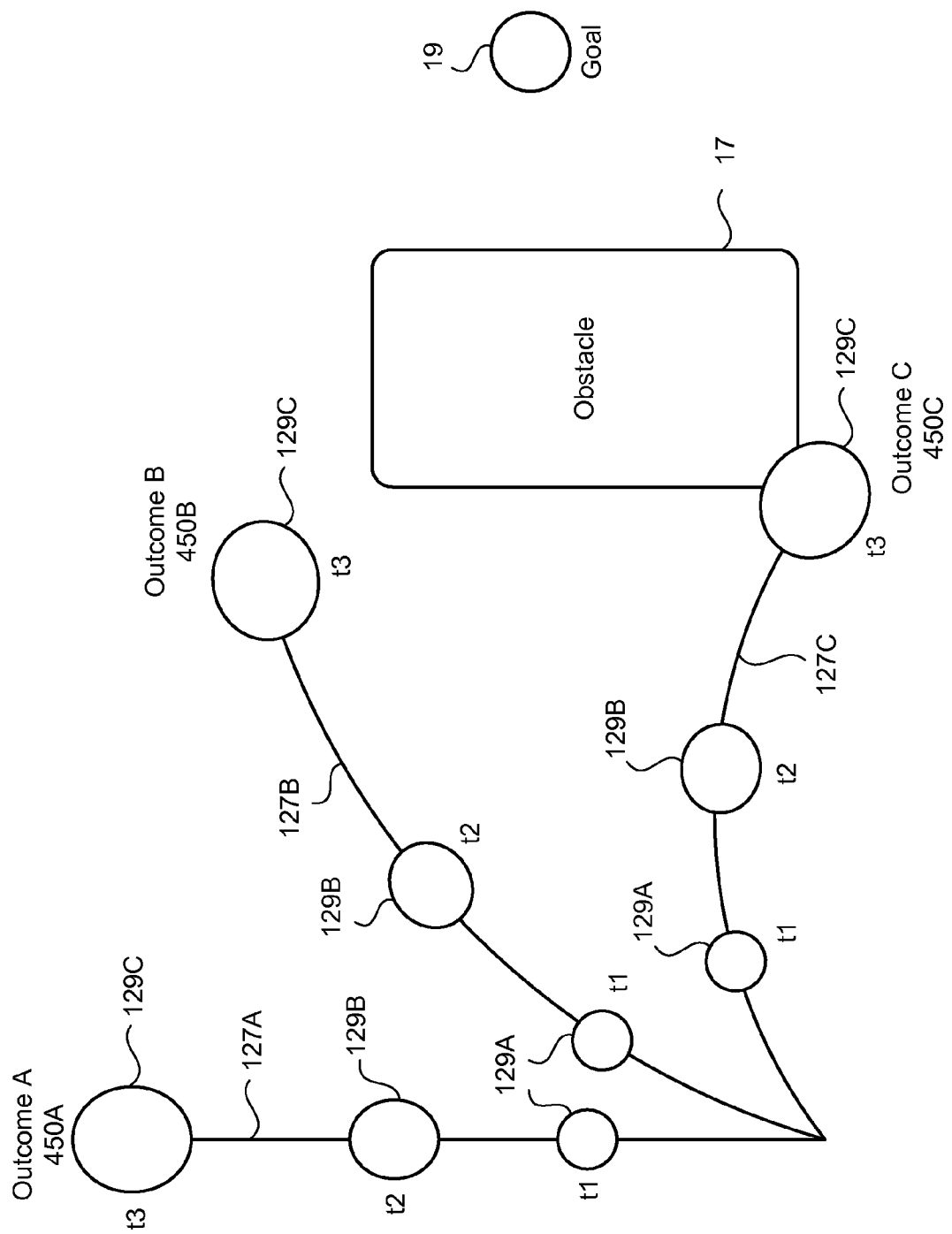
FIG. 6C is a schematic view of three simulated trajectories of three outcomes generated for three corresponding commands.

Sensors and actuators that make up robotics systems are not deterministic. They are subject to error from a variety of sources whether it be internal estimation error or errors incurred by uncontrolled environments. The behavior system 104 provides a field 129 to model this error with standard deviation for all states in the system 100. This allows the robot resources 122 to report their uncertainty to the action models 400 through state feedback and allows the behaviors 300 to consider uncertainty when making a decision. For example, consider a drive system 122 that naturally slips when it rotates. When the action model 400 for the drive system 122 generates outcome trajectories for a set of commands 440, it can take this rotation uncertainty into account by providing an increased uncertainty for states in trajectories with more rotation. FIG. 6C provides simulated trajectories 127A, 127B, 127C of the movement of the drive system X-Y resource 122 for three different outcomes 450A, 450B, 450C, as a result of three different commands 440A, 440B, 440C. Each trajectory 127A, 127B, 127C has three time steps t1, t2, t3, each with an uncertainty region 128A, 128B, 128C that defines a probably space 129A, 129B, 129C (e.g. based on standard deviation) in which the drive system X-Y resource 122 will be located at the corresponding time step t1, t2, t3 for each outcome 450A, 450B, 450C.

When a behavior 300 evaluates the trajectories 127A, 127B, 127C, it can consider the uncertainty. For the specific example of a collision avoidance behavior, the shortest path to a goal point (or state) 19 may include more rotation and as a result have more uncertainty. The predicted state may not collide with an object, but if the uncertainty is factored in, then the trajectory has a chance to collide. The behavior 300 can then choose to take a longer path to the goal 19 that does not have a chance to collide with an obstacle 17. How to model the uncertainty can be fixed or it can adapt to the environment as the robot gets feedback as to how its commands are relating to its actual state in the world, so a robot that travels on cement then transitions to sand may have its model adapt from a low level of uncertainty in command to trajectory relationship to a higher level of uncertainty. With the third outcome 450C, the drive system X-Y resource 122 has the possibility of colliding with the obstacle 17 at time step t3. When the collision avoidance behavior 300 evaluates the outcomes 450A, 450B, 450C, the behavior 300 will score the third outcome 450C the lowest, since it has the possibility of causing a collision with the obstacle 17, the second outcome 450B the highest, since it leads the drive system X-Y resource 122 around the obstacle toward the goal point (or state) 19, and the first outcome 450A in between the second outcome 450B and the third outcome 450C.

This prediction process is optimized and repeated many times each second (e.g. ~30 Hz), and works like a predictor-corrector system for the current command set. Having the time-evolution of the trajectory of the current command 430 available to the behaviors 300 allows the behaviors 300 to incorporate both static and dynamic hazards into their evaluations of the outcomes. This combination of reactive and predictive action selection provides safety and responsiveness in the action selection process.

The action selection engine 200 can conduct a cascading closed loop selection of a command 440 within the action space 410, in the sense that it is a periodic cycle tied to the current system state feedback and only uses the predicted outcomes 450 to select commands 440, rather than counting on any real-time outcomes. The action selection engine 200 uses the current state of the robot (e.g. current position, velocity, acceleration, and/or other telemetry of each resource 122) and continuously updates and runs the action selection cycle 210. A feasible sub-region or dynamic window 420 of the action space 410 is computed by the action model 400 based on limits and current state values. This dynamic window 420 is used to constrain the generated commands 440 so that the action selection engine 200 may select the best available feasible command 440. This command 440 may not be globally optimal, but is a "locally good" solution that respects the dynamic (mechanical, etc.) limits of the system. The action model 400 is adaptive such that the action space 410 to be searched is scaled from a feasible size to an even smaller size based on a command history. As a result, the action selection engine 200 will not repeatedly select a command 440 near a limit. For example, if the command history includes moving to a certain spot each time, the search window 420 is sized to increase a resolution around a region most searched in the past. Consequently, the action selection engine 200 is based on forward modeling (e.g. non-inverting) and conducts local path planning. A problem size of the action space 410 is reduced by solving for the best available command 440 in each action space 410 one by one (during each cycle) instead of solving for the "global best available feasible" command 440 all at once. For example, instead of searching 10*10*10*10 options using 10^4 CPU cycles, the action selection engine 200 searches 10+10+10+10 options using 40 CPU cycles. This allows the robot to be relatively smart on small/old (low capacity) embedded processors.

Generally, there is not enough time to search the entire action model 400 exhaustively for the best command 440 having the best outcome 450. The action selection engine 200 performs a heuristic, time-bounded search over a feasible action space 410 for feasible commands 440 that satisfy the preferences of the connected behaviors 300. Preferably, a search technique known as hill climbing is used based around the previously selected command value for each action space 410. Many other heuristics may be added over time because action models 400 may be replaced by any component that conforms to the action model API 402. This also allows new search heuristics to be added without rewriting the behaviors 300 in the system 104. The action selection engine 200 has multiple degrees of freedom and performs implicit evaluations. The heuristic searches are provided by the plug-in action models 400, which allows for new heuristic searches to be added to the robotics system 100 without re-writing behaviors 300.

Figure 7:
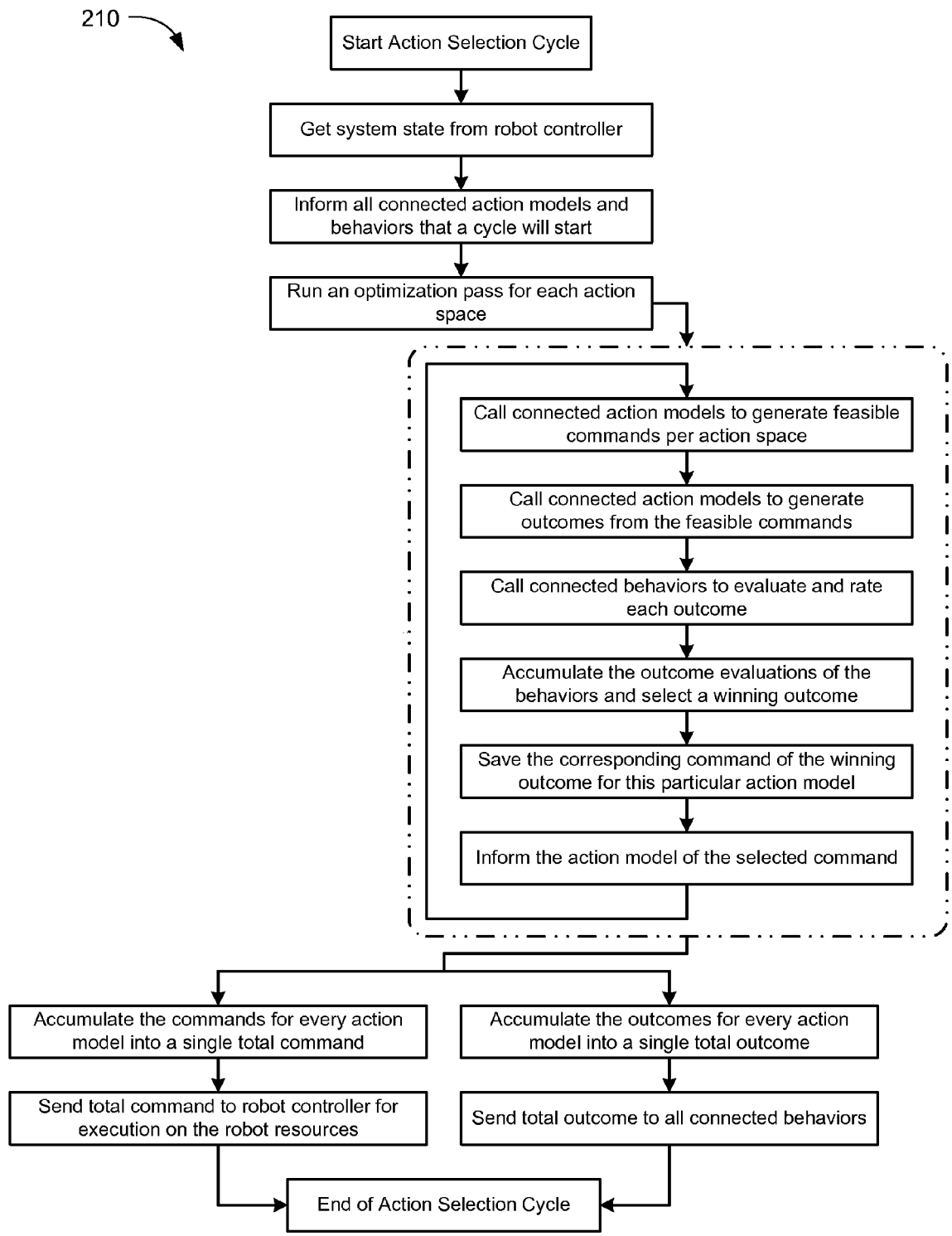
FIG. 7 is a flow chart of an action selection cycle.

Referring to FIG. 7, the action selection engine 200 acts as a manager or hub of activity in the action selection process. The action selection engine 200 executes a periodic action selection cycle 210 that includes the following steps: 1) getting a system state from the robot controller 140; 2) informing all connected action models 400 and behaviors 300 that a cycle will start (e.g. by calls their respective APIs 402, 302) and providing them the current system state; 3) running an optimization pass for each action space 410 of each action model 400 separately in the order in which they are configured; and 4) accumulating the commands 440 for every action model 400 into a single "overall command" 442 for the entire robot system 100. The action selection engine 400 executes the optimization pass for each action space 410 by: 1) calling the connected action model 400 to generate feasible commands 440; 2) calling the connected action model 400 to generate (simulate) outcomes 450 from these feasible commands 440; and 3) calling the connected behaviors 300 to evaluate the outcomes 450 and provide a rating or evaluation 460 of each outcome 450, expressing how good or bad those outcomes are based on their preferences, on a scale from [−1,1] where −1 means highly undesirable, 1 means highly desirable, and 0 means indifferent. An evaluation function selects an outcome 450 to pick a coherent action of the robot. Although there can be behaviors 300 that combine the outcome evaluations 460 of other behaviors 300 (hierarchy) using many varied policies, the basic policy used by the core action selection engine 200 is one of weighted summation. The action selection engine 200 accumulates the outcome evaluations 460 of the behaviors 300, by a weighted sum of evaluations 460, and selects the best (highest rated) outcome 450 as the winner. The action selection engine 200 saves the corresponding command 440 of the winning outcome 450 for this particular action model 400 and informs the action model 400 of the selected command 440 as feedback. The action models 400 are configured to generate commands 440 that are both feasible and randomized using a mixture distribution between local and "exploration" changes from a current command 430.

The evaluation function(s) of a behavior 300 may be based on sensor data from a component external to the resources 122. Generally, data inherent to an axis of a resource 122 is passed to the action models 400 and behaviors 300 along with other system state information at the start of an action selection cycle 210. For example, encoder information (e.g. position) is included in the system state information. However, sensor data from external components (e.g. a laser range finder or a global positioning system on a mobile robot) are accessed by the action models 400 and behaviors 300 through the pub/sub system of the local network 110. Referring back to FIG. 6C, now include the example of a laser range finder attached to the robot and the collision avoidance behavior 300 connected to the action selection engine 200. A set of data (either raw or processed by another system component) providing information from a scan around the robot (e.g. 180°) is published (to the pub/sub system of the local network 110) by the laser range finder for access by other components in the robotics system 100. During an action selection cycle 210, the obstacle avoidance behavior 300 subscribes (to the pub/sub system of the local network 110) to use the laser range finder data to identify or detect obstacles in the environment about the robot. The obstacle avoidance behavior 300 then evaluates the three provided outcomes 450A, 450B, 450C in light of its awareness of the obstacle 17 between the robot and the goal position (or state) 19. The behavior 300 will score the third outcome 450C the lowest, since it has the possibility of causing a collision with the obstacle 17, the second outcome 450B the highest, since it leads the X-Y actuator resource 122 around the obstacle toward the goal point (or state) 19, and the first outcome 450A in between the second outcome 450B and the third outcome 450C.

In another example for a floor cleaning robot, the behavior system 104 may be used to influence the cleaning path of the robot. In one example, the cleaning robot includes a robot body carrying a drive mechanism that both drives the robot forward in a drive direction over a support surface. The robot includes a forward obstacle sensor responsive to objects encountered by the robot while moving in the drive direction. A side sensor is positioned to detect proximity of objects on a dominant side of the robot, transverse to the direction of travel. The dominant side of the robot is the side that is kept near or in contact with an object (or obstacle) when the robot cleans the area adjacent to that object (or obstacle). The robot body may be asymmetrically shaped to define the dominant side. A surface area processing mechanism, such as a side brush, is effective on the dominant side of the robot. The side brush extends from the dominant side of the robot and operates to sweep debris from beyond a robot perimeter for collection by the robot. When the forward sensor detects an object in the direction of travel of the robot, it publishes sensor data to the pub/sub system of the local network 110. During an action selection cycle 210, a wall following behavior 300 subscribes to the local network 110 to obtain the available forward sensor data for consideration during evaluation of provided outcomes 450. The goal of the wall following behavior 300 is clean up next to walls. When the behavior 300 learns that the forward sensor has detected an object in the direction of travel of the robot, it will score highly outcomes 450 corresponding to drive commands 440 that turn the robot to locate the detected object on the dominant side of the robot and that drive the robot to keep the detected object on the dominant side of the robot, while the surface area processing mechanism processes a portion of the support surface adjacent the object on the dominant side.

Figure 8:
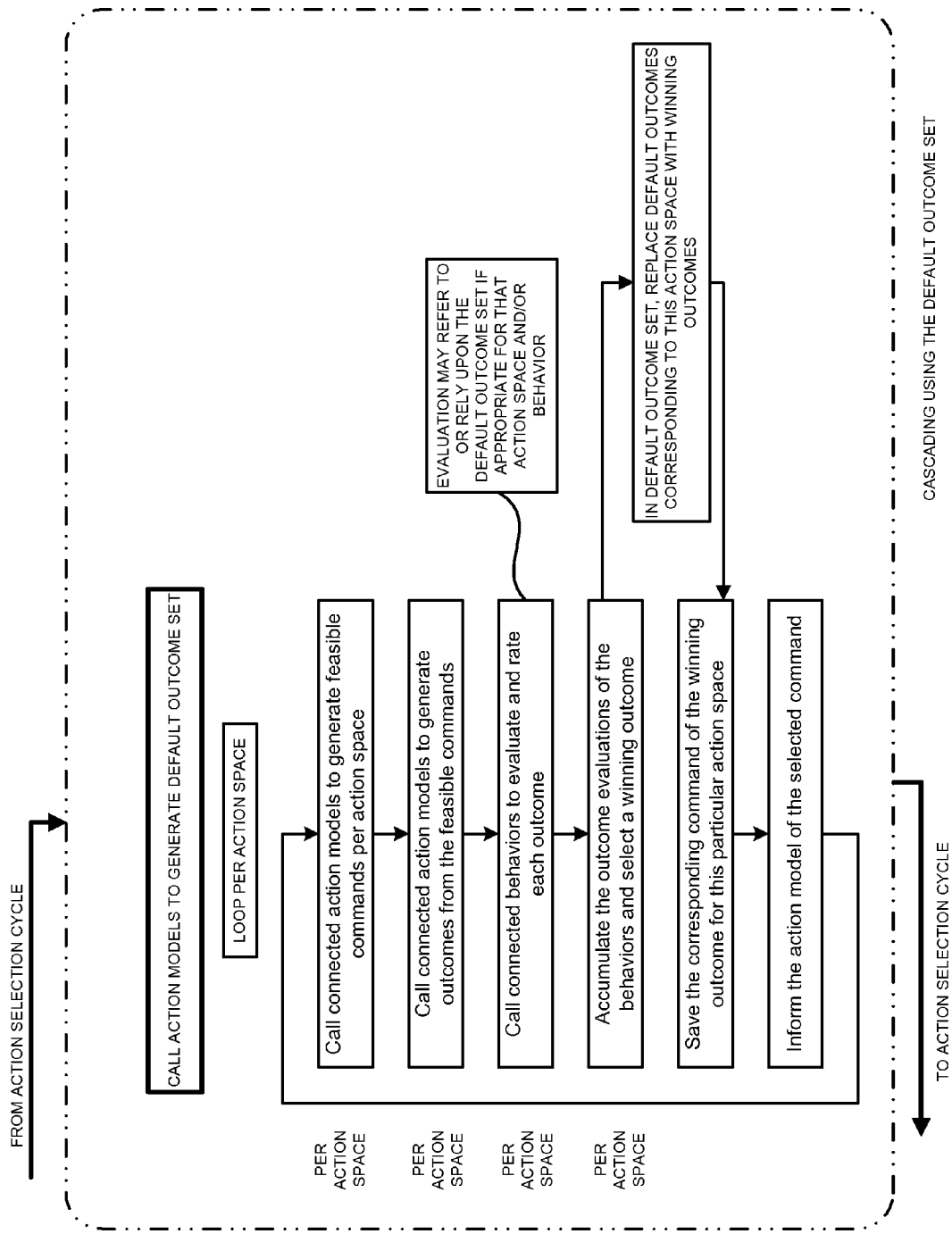
FIG. 8 is a flow chart of an optimization pass loop over every action space during an action selection cycle.
Figure 11:
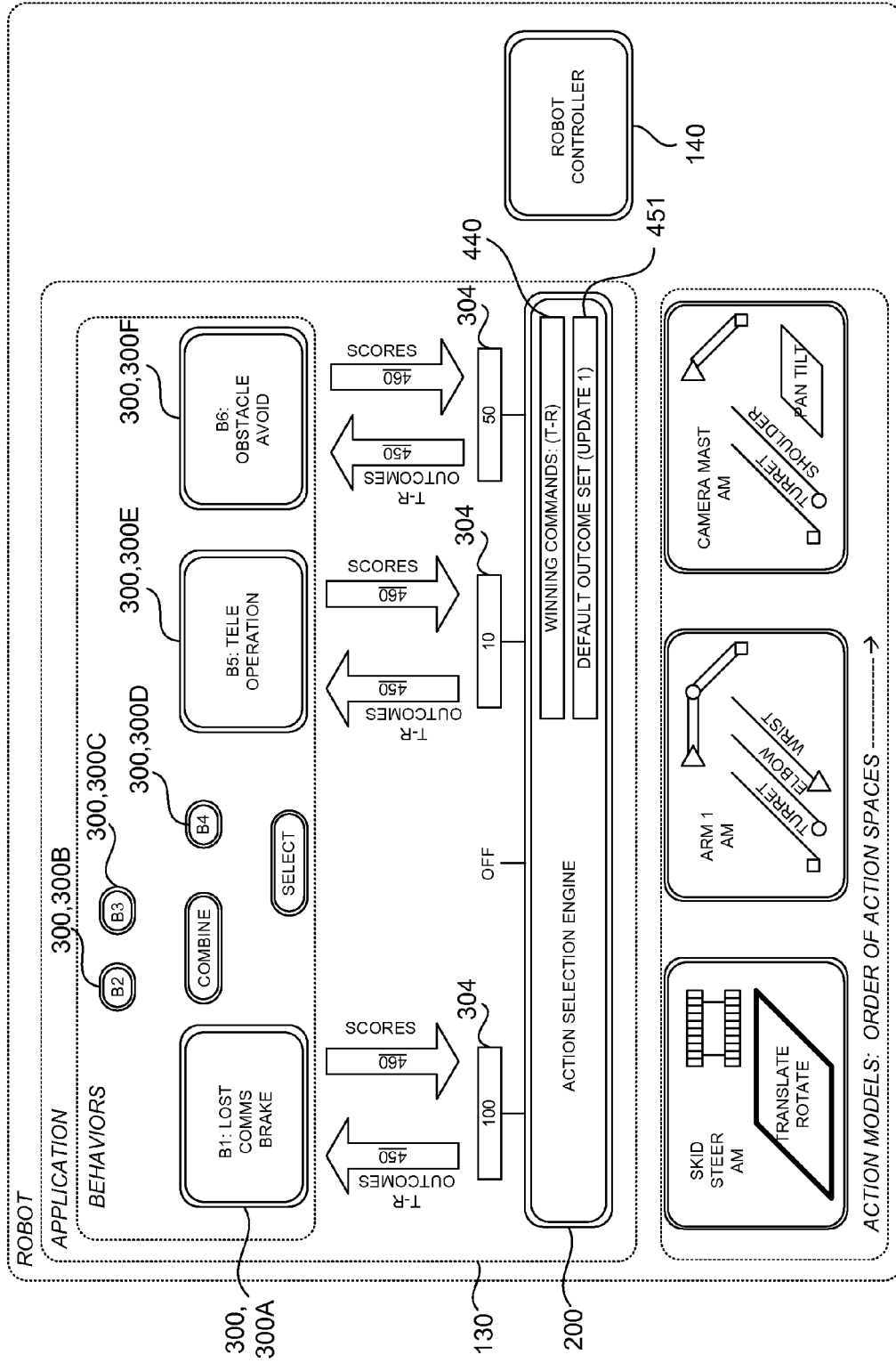
FIG. 11 is a schematic view the robotics system of FIG. 10 when the action selection engine sends outcomes to behaviors for evaluation.

In the example shown in FIG. 8, the action selection cycle 210 includes calling the action models 400 to each generate a default outcome set 451 (see FIG. 11). When the behaviors 300 evaluate and rate each outcome 450, their evaluation may refer to or rely on the default outcome set 451, if appropriate for that action space 410 and/or behavior 300. Furthermore, the selected winning outcome 450 can be used to update or replace the default outcome set 451 for that action space 410.

Referring again to FIG. 7, after each action model 400 has been processed, the action selection engine 200 uses the accumulated chosen commands 440 for each action model 400 to generate a single "overall command" 442 for the entire robot system 100. The overall command 442 is sent to the robot controller 150 for communication to the resource control arbiters 122 for execution on the robot resources 122. The "overall command" 442 has a simulated "overall outcome" 452 generated by accumulating the corresponding outcomes 450 of the chosen commands 440 of the action models 400. This "overall outcome" 452 is passed along as feedback to all connected behaviors 300 indicating the end of the action selection cycle 210.

Figure 9:
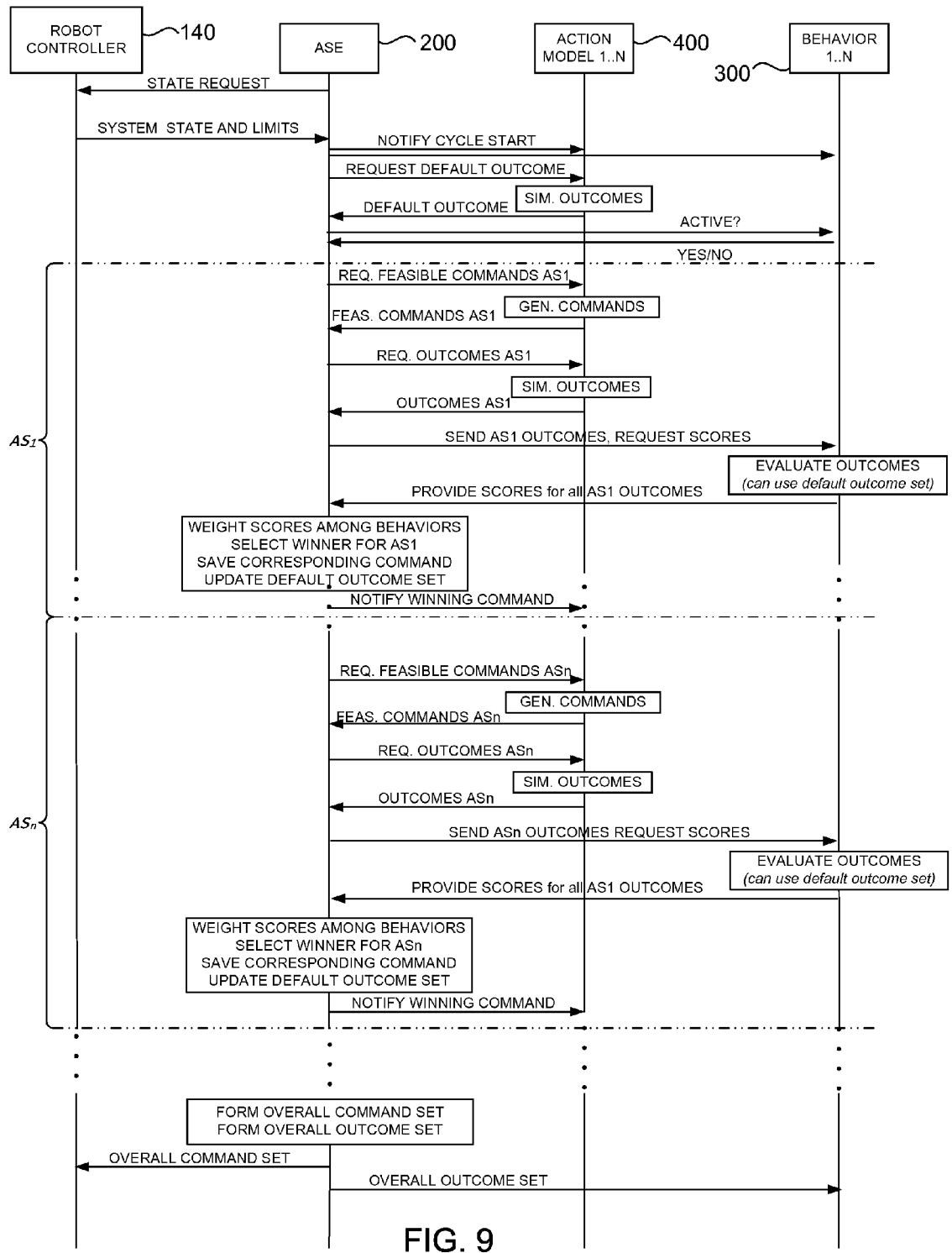
FIG. 9 is a flow chart of an action selection cycle.

FIG. 9 illustrates an example action selection cycle 210. The action selection engine 200 commences by submitting a state request to the associated robot controller 140. The robot controller 140 returns its system state and limits. Next, the action selection engine 200 notifies all connected action models 400 and behaviors 300 that the action selection cycle 210 will be starting. The action selection engine 200 requests a default outcome set 451 from each action model 400, which may be used or referred by the behaviors 300 for evaluating outcomes 450. The action selection engine 200 proceeds to loop through each action space 410 of each action model 400. The action models 400 have a predetermined order (e.g. by influence on the robot) for sequential processing by the action selection engine 200. Similarly, each action space 410 in the action model 400 has a predetermined order (e.g. by influence on the resource(s) 122) for sequential processing by the action selection engine 200.

Figure 10:
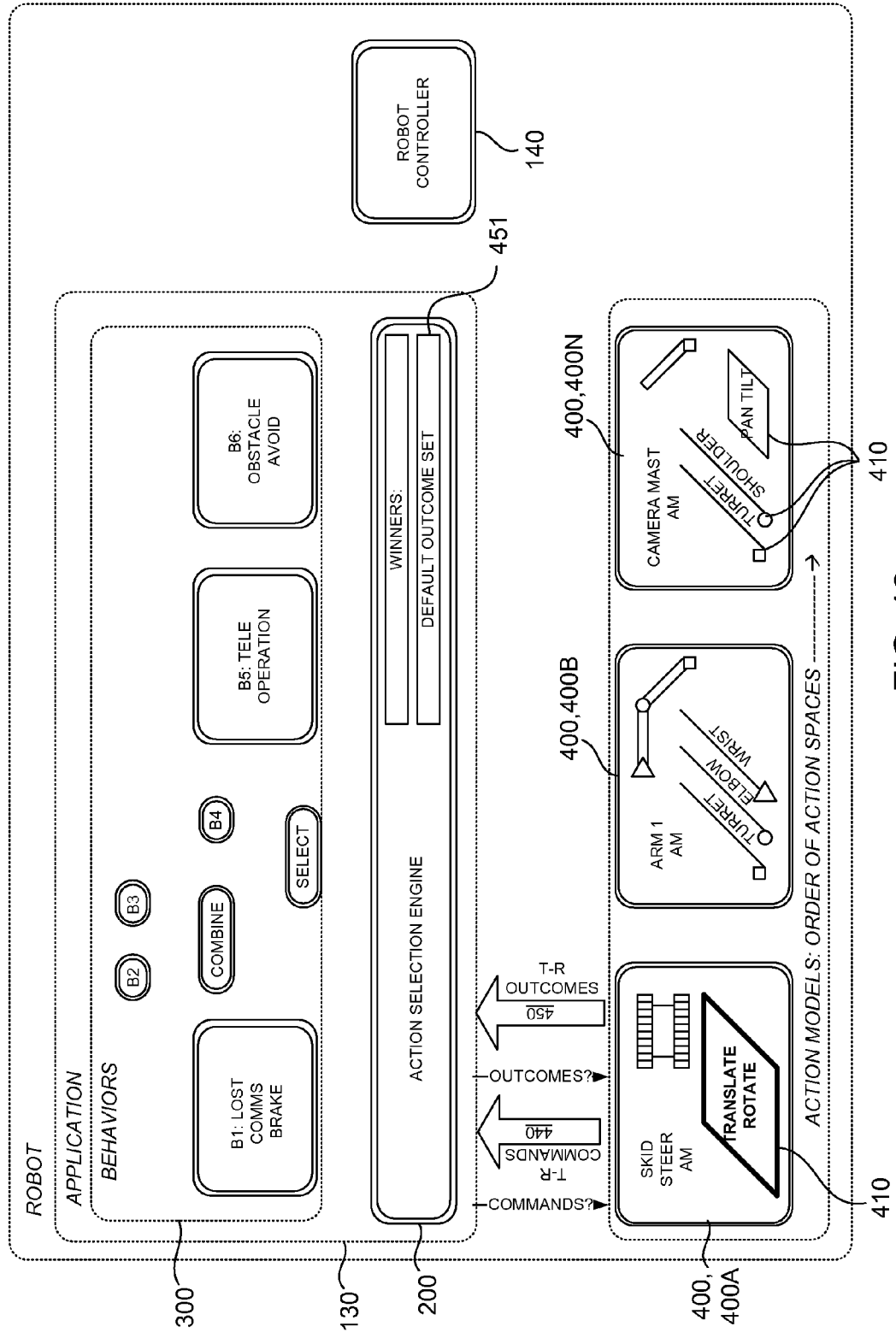
FIG. 10 is a schematic view of a robotics system during a step of the action selection cycle when an action selection engine calls a first action model to generate feasible commands and corresponding outcomes for each action space of the action model.

Referring to FIGS. 9-10, the action selection engine 200 calls the first action model 400A to generate feasible commands 440 and corresponding outcomes 450 for each action space 410. In the example shown in FIG. 10, the first action model 400A has a two-dimensional action space 410 that models translate and rotate for a skid steer resource 122. The action selection engine 200 calls this first action model 400A to generate feasible commands for the translate and rotate action space 410. The action selection engine 200 calls this first action model 400A to generate or simulate outcomes 450 or predicted future states of the skid steer resource 122 that would occur for each feasible command 440.

Referring to FIGS. 9 and 11, the action selection engine 200 sends the outcomes 450 to each active behavior 300 for evaluation. Each behavior 300 has a status and weight property 304 which indicates whether the behavior 300 is active and its weight. On each action selection cycle 210, behaviors 300 can choose whether or not to participate in the evaluation process of the simulated outcomes 450. At the beginning of each action selection cycle 210, the action selection engine 200 asks each behavior 300 if it wishes to participate in that cycle. If a particular behavior chooses not to participate, its status is set to "OFF". For the remaining duration of that action selection cycle 210, the action selection engine 200 only interacts with those behaviors 300 that have decided to participate and are hence 'active behaviors' for the cycle. This provides very easy and flexible mission policy management. The behavior weight 304 is used to increase the influence of the scores or outcome evaluations of that particular instance of the behavior 300. The behavior weight 304 is not a fixed property of the associated behavior, but rather a weight associated with that instance of the behavior 300. The behavior 300 implements an evaluation heuristic based on a specific end goal and doesn't need to know how important it is. The behavior weight 304 is relevant in the context of the overall design of an application 130. The same behavior 300 can have a different level of importance or weight 304 for different types of applications 130.

In the example shown in FIG. 11, there are three active behaviors 300. The first behavior is a lost communications/set the brake ("lost comms") behavior 300A, which causes the robot to brake or halt some or all of its actions when it loses communications with an operator controller unit. The second, third, and fourth behavior 300B, 300C, 300D are shown as inactive for this action selection cycle 210. The fifth behavior 300E is a teleoperation behavior for remote control of the robot. The sixth behavior 300F is an obstacle avoidance behavior. In the example shown, the lost comms behavior 300A has the highest weight 304 (e.g. 100) amongst the other behaviors 300, since it prevents the robot from wandering off when communications fail. The obstacle avoidance behavior 300F has the next highest behavior weight 304 of half as much as the lost comms behavior 300A, followed by the teleoperation behavior 300E, which has a behavior weight 304 of only a tenth of the lost comms behavior 300A. The active behaviors 300A, 300E, 300F evaluate the outcomes 450 and return their weighted scores or outcome evaluations 460 to the action selection engine 200. The action selection engine 200 selects the outcome 450 having the highest weighted outcome evaluation 460 as the winning outcome 450 for that action space 410, 410A. The action selection engine 200 stores the command 440 corresponding to the winning outcome 450 for generating an overall command 442 based on the winning commands 440 for each action space 410 of each action model 400. The action selection engine 200 updates the default outcome set 451 with the winning outcome 450.

Figure 12:
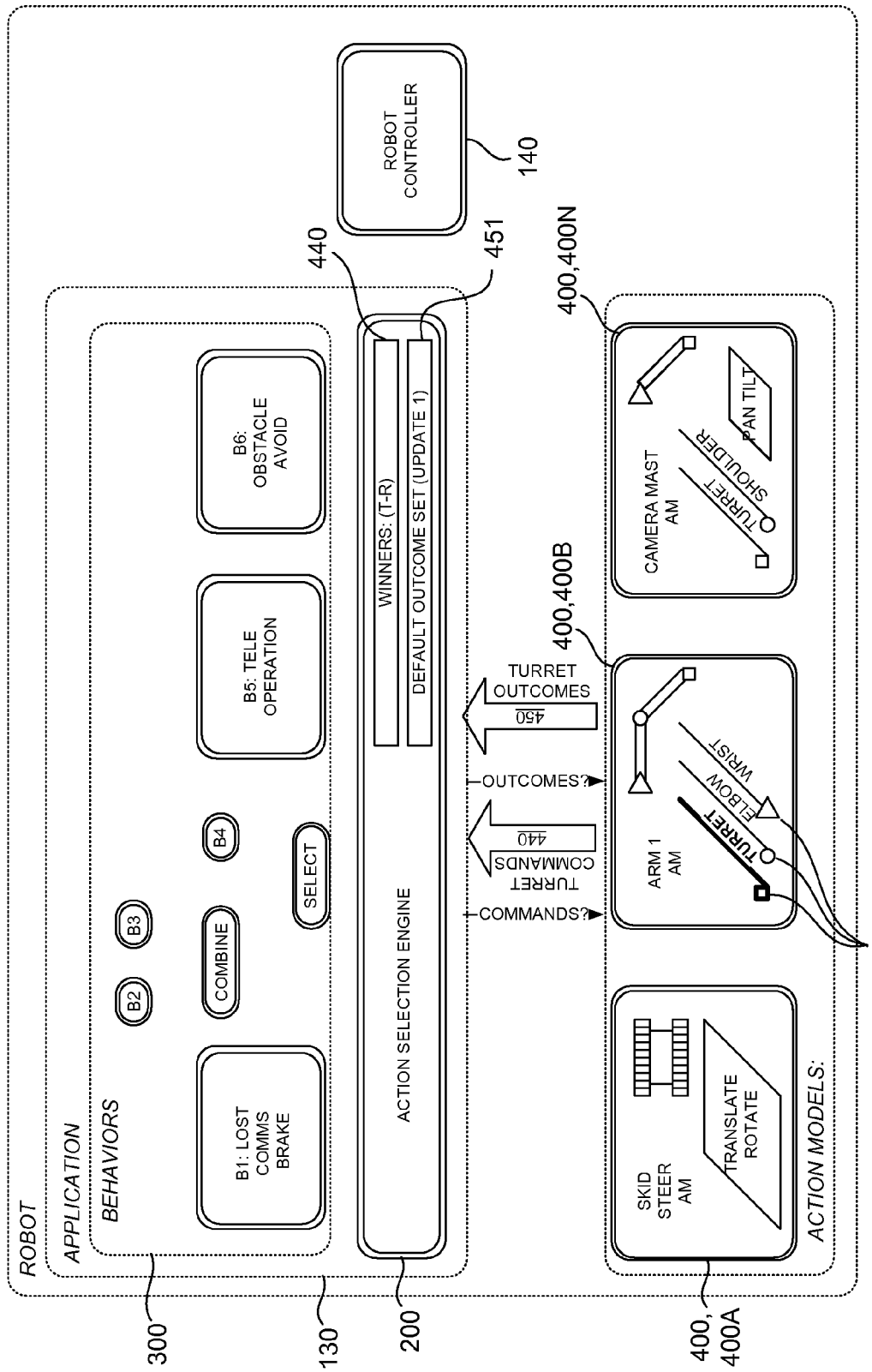
FIG. 12 is a schematic view of a robotics system the robotics system of FIG. 10 when the action selection engine calls a second action model to generate feasible commands and corresponding outcomes for a first action space of the action model.

Referring to FIGS. 9 and 12, the action selection engine 200 next calls the second action model 400B to generate feasible commands 440 and corresponding outcomes 450 for each action space 410. In the example shown in FIG. 12, the second action model 400B has three one-dimensional action spaces 410 that model a turret, an elbow, and a wrist for an arm resource 122. The action selection engine 200 calls the second action model 400B to generate feasible commands for the turret action space 410 first, as it is the first ordered action space 410. The action selection engine 200 calls the second action model 400B to generate or simulate outcomes 450 or predicted future states of the arm resource 122 that would occur for each feasible command 440.

Figure 13:
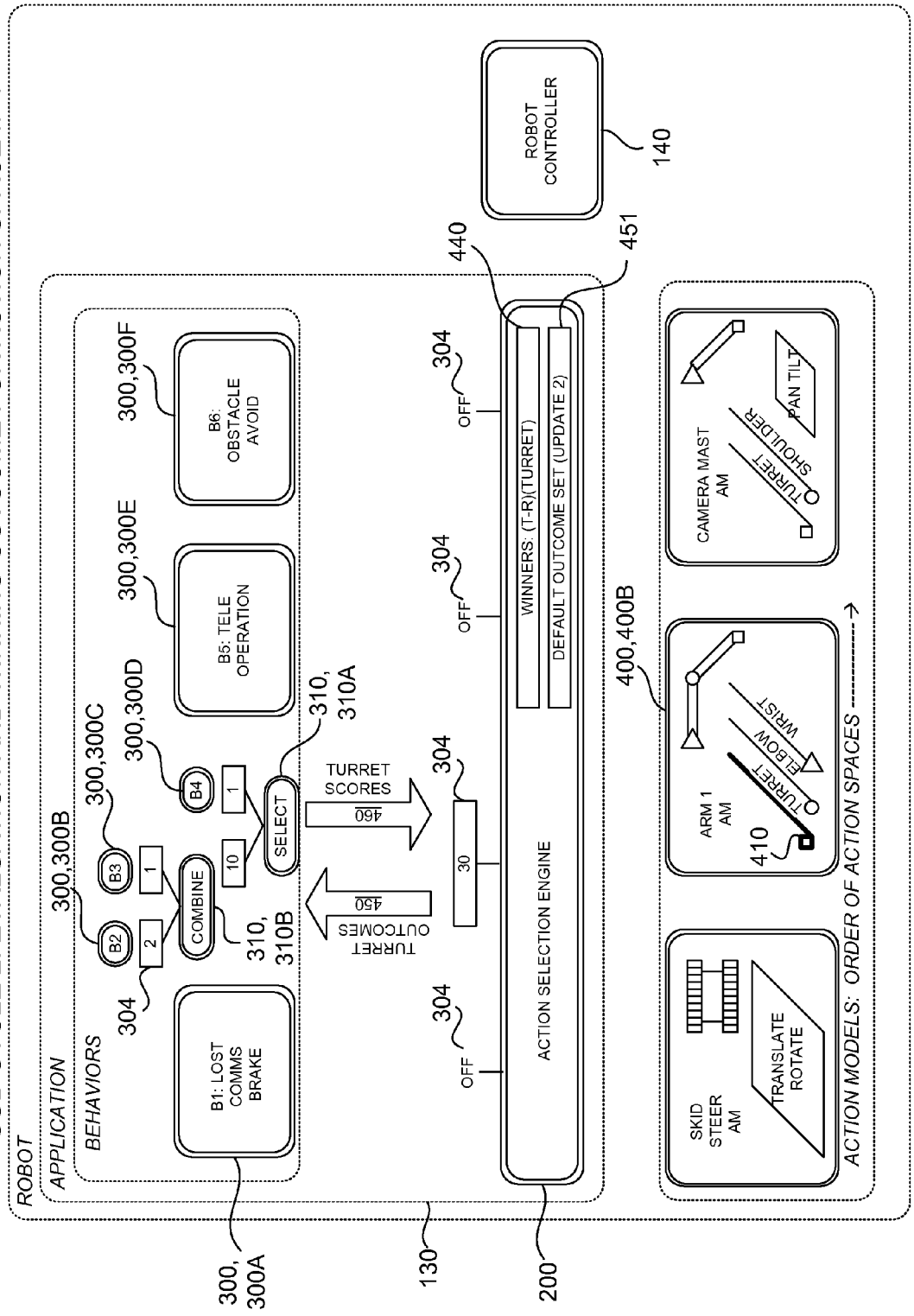
FIG. 13 is a schematic view of the robotics system of FIG. 12 when the action selection engine sends outcomes to the behaviors for evaluation.

Referring to FIGS. 9 and 13, the action selection engine 200 sends the outcomes 450 of the first action space 410 of the second action model 400B to each active behavior 300 for evaluation. In the example shown in FIG. 13, there is only a behavior policy 310 active to receive the outcomes 450. Behavior policies 310 are used to provide logic to the selection and use of behaviors 300 and will be described in further detail below. The action selection engine 200 selects the outcome 450 having the highest weighted outcome evaluation 460 as the winning outcome 450 for that action space 410, 410A. The action selection engine 200 stores the command 440 corresponding to the winning outcome 450 for generating an overall command 442 based on the winning commands 440 for each action space 410 of each action model 400. The action selection engine 200 updates the default outcome set 451 with the winning outcome 450.

Figure 14:
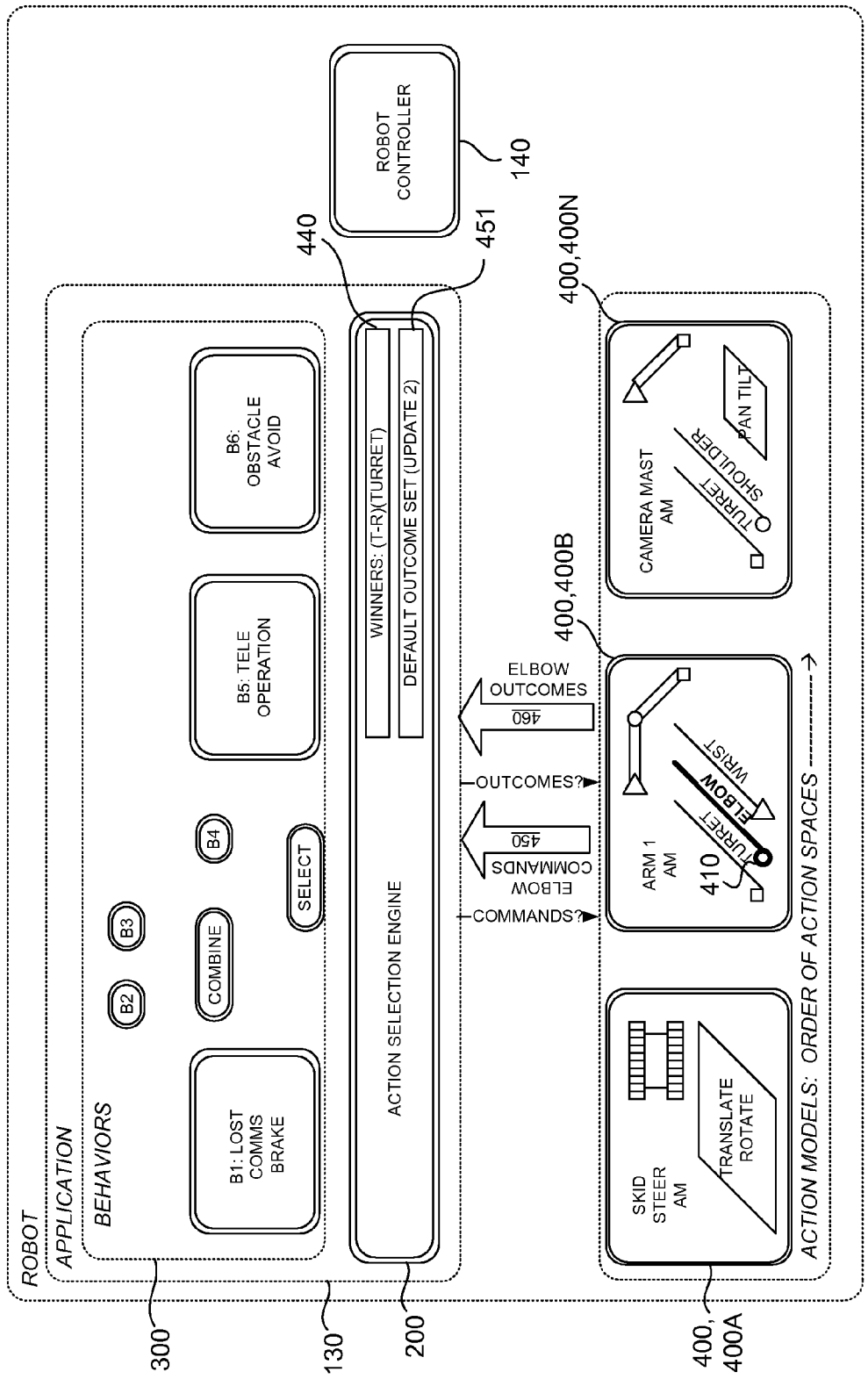
FIG. 14 is a schematic view of the robotics system of FIG. 12 when the action selection engine calls the second action model to generate feasible commands and corresponding outcomes for a second action space of the action model.

Referring to FIGS. 9 and 14, the action selection engine 200 next calls the second action model 400B to generate feasible commands 440 and corresponding outcomes 450 for the next action space 410. In the example shown in FIG. 14, the action selection engine 200 has the elbow action space 410 of the second action model 400B generate feasible commands 440 as well as simulate outcomes 450 (or predicted future states) of the arm resource 122 that would occur for each feasible command 440. The action selection cycle loops through this action space 410 and then the wrist action space 410 to complete the optimization pass of the second action model 400B, before looping the optimization pass over the action space(s) 410 of the next action model 400 in order, the camera mast action model 400C.

Figure 15:
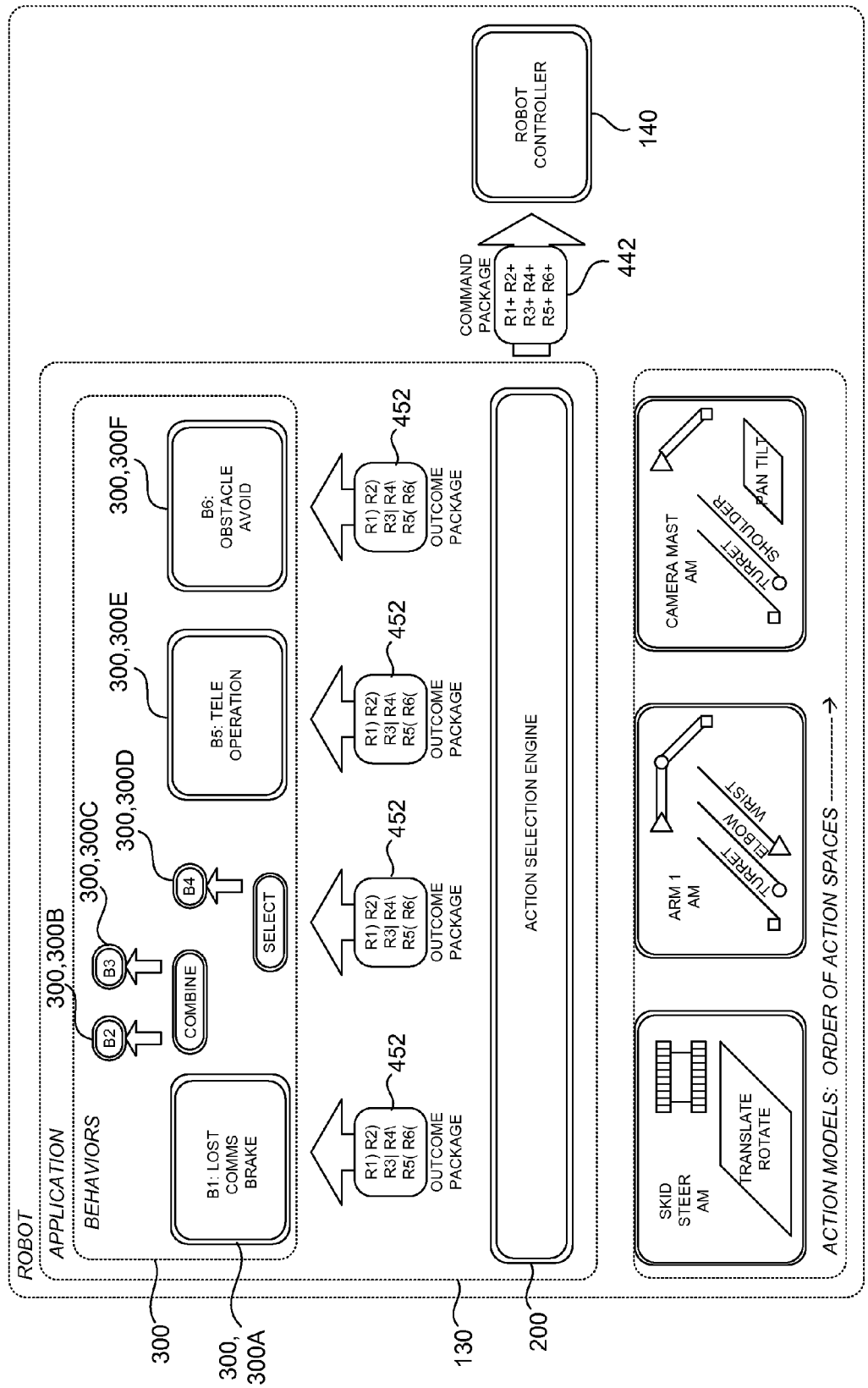
FIG. 15 is a schematic view the robotics system of FIG. 10 when the action selection engine sends an overall command package to a robot controller and an overall outcome package to the behaviors as feedback.

Referring to FIGS. 9 and 15, after each action model 400 has been processed, the action selection engine 200 uses the accumulated winning commands 440 for each action space 410 of each action model 400 to generate a single "overall command" 442 for the entire robot system 100. The overall command 442 is sent to the robot controller 150 for communication to the resource control arbiters 122 for execution on the robot resources 122. The "overall command" 442 has a simulated "overall outcome" 452 generated by accumulating the corresponding outcomes 450 of the chosen commands 440 of the action models 400. This "overall outcome" 452 is passed along as feedback to all connected behaviors 300 indicating the end of the action selection cycle 210.

Figure 16:
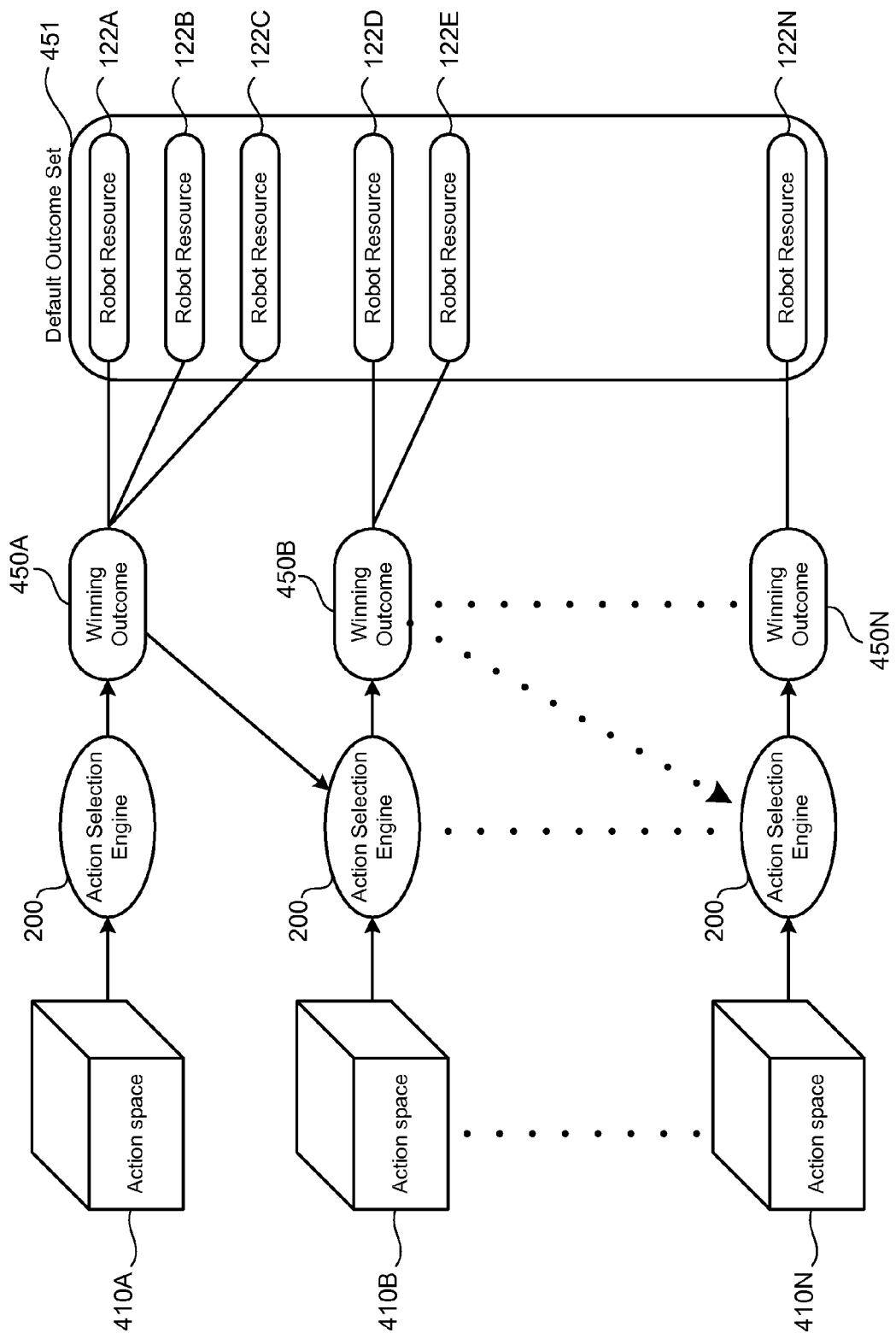
FIG. 16 is a schematic view of an action selection engine using a default outcome set for choosing a winning outcome for each action spaces.

Referring to FIG. 16, the action selection engine 200 can execute a cascading selection of outcomes on multiple action spaces 410 having multi-criteria ordering (e.g. lexicographic ordering set by the action model 400) within an action model 400. As the action selection engine 200 chooses a command 440 and corresponding outcome 450 for each action space 410 (or action model 400) on an action selection cycle 210, the consequences of this choice, in terms of outcomes 450, are propagated forward so that a subsequent action selection cycle 210 passing through the behaviors 300 in subsequent action spaces 410 (or action model 400) may observe the results of the command selected in the previous action space by accessing the default outcome set 151. This reduces the negative consequences from not performing a full, exhaustive search of the action spaces 410 (or action model 400). As illustrated, the action selection engine 200 steps through each action space 410 individually according to a predetermined order and selects an outcome 450 for each action space 410. The action spaces 410 are typically ordered according to their level of influence on robot actions. The selection of outcomes 450 follows a progressive commitment, where an outcome 450 for each action space 410 is determined based on the outcomes 450 of any preceding action spaces 410. In each action selection cycle 210 the default outcome set 451 is updated with the winning outcome 450 for each modeled resource 122. Referring back to FIG. 5, which depicts a robot arm 500 having a turret 510, a shoulder 520, an elbow-1 530, and an elbow-2 540. The action model 400 for the arm 500 has a corresponding turret action space 412A, a shoulder action space 412B, elbow-1 action space 412C, and elbow-2 action space 412D. The action selection engine 200 calls the action model 400 of a robots arm 500 to provide sets of feasible commands 440A, 440B, 440C, 440D and corresponding sets of expected outcomes 450A, 450B, 450C, 450D for each action space 412A, 412B, 412C, 412D. When the action selection engine 200 steps though each action space 412A, 412B, 412C, 412D, it determines their winning outcomes 450A, 450B, 450C, 450D while referring to the winning outcomes 450A, 450B, 450C, 450D of any previous action spaces 412A, 412B, 412C, 412D stored in the default outcome set 451. For example, when the action selection engine 200 steps to the elbow-2 action space 412D, it will consider the winning outcomes 450A, 450B, 450C of the previous three action spaces 412A, 412B, 412C when deciding the winning outcome 450D for the fourth, elbow-2 action space 412D.

Referring to FIGS. 17-20, behaviors 300 are used to organize, structure, and provide logic to the selection and use of behaviors 300 in applications 130 to achieve specific goals while respecting specific constraints including the constraints derived from the actuator systems of the robot. Because the evaluation function of a behavior 300 can be an arbitrary policy that combines the outcome evaluation values 460 from multiple sub-behaviors 300, a hierarchical collection of behaviors 300 may be used to allow many new policies of coordination to be added. Typical behavior policies 310 for behaviors 300 that combine the evaluation of sub-behaviors 300 include a select behavior policy 310A, a combine behavior policy 310B, a switch behavior policy 310C, and a sequence behavior policy 310D.

Figure 17:
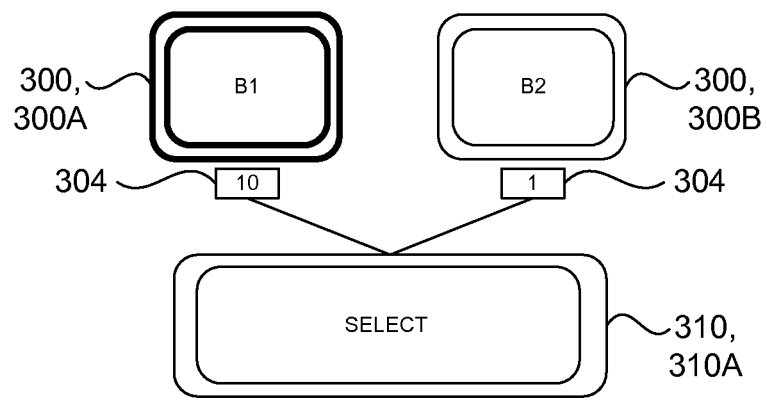
FIG. 17 is a schematic view of a select behavior policy.

Referring to FIG. 17, the select behavior policy 310A selects the active connected behavior 300 or behavior policy 310 with the highest behavior weight 304. In the example shown, the select behavior policy 310A selects the active first behavior 300A having a behavior weigh 304 of 10 to the exclusion of the active second behavior 300B having a behavior weigh 304 of 1.

Figure 18:
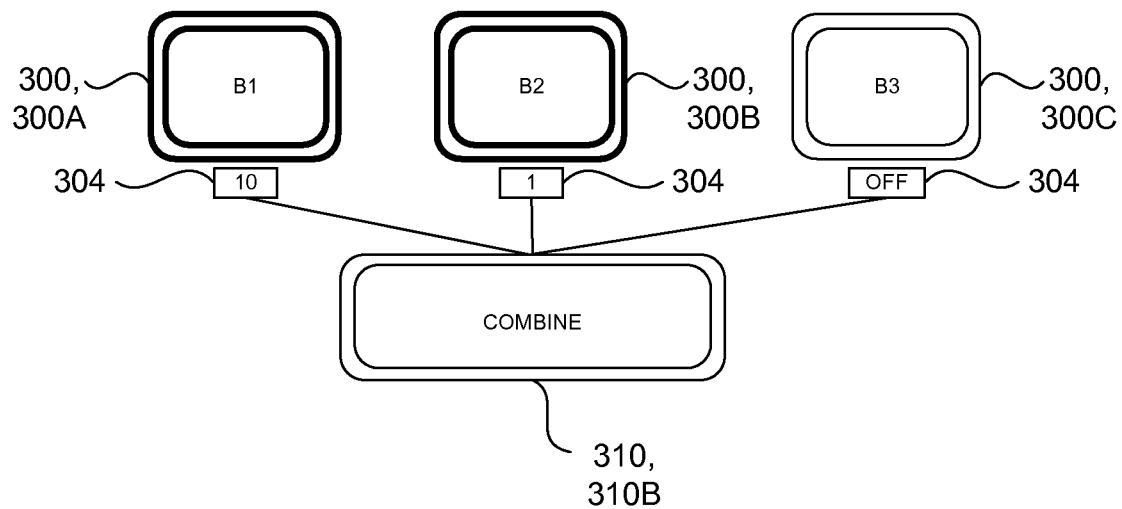
FIG. 18 is a schematic view of a combine behavior policy.

Referring to FIG. 18, the combine behavior policy 310B combines the outcome evaluations 450 of the active connected behaviors 300 or behavior policies 310. In the example shown, the combine behavior policy 310B checks to see which connected behaviors are active. In this case, the first and second behaviors 300A, 300B are active, while the third behavior 300C is inactive for this particular action selection cycle 210. The combine behavior policy 310B combines the outcome evaluations 450 of the first and second behaviors 300A, 300B, weighted according to their respective behavior weights 304, while ignoring the inactive third behavior 300C.

Figure 19:
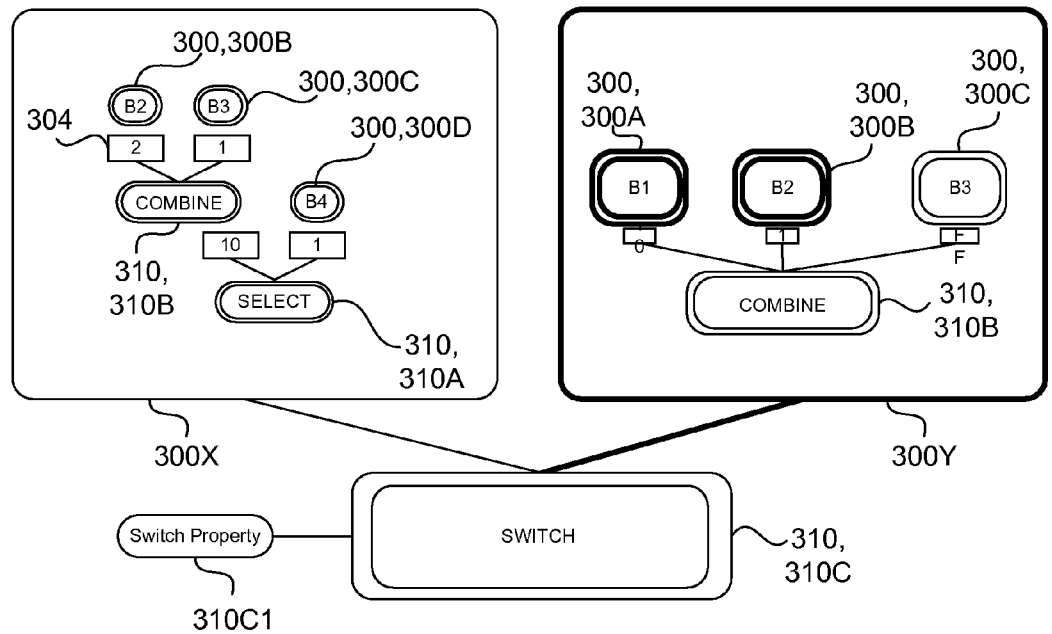
FIG. 19 is a schematic view of a switch behavior policy.

Referring to FIG. 19, the switch behavior policy 310C switches between two or more groups of behaviors 300 based on a switch property 310C1 that can be set each action selection cycle 210 (e.g. via the event processor 280). The switch behavior policy 310C allows a particular group of behaviors 300 to be exclusively available amongst other connected groups of behaviors 300. In the example shown, the switch behavior policy 310C switches between a first behavior group 300x and a second behavior group 300Y based on the associated switch property 310C1. In this case, the switch behavior policy 310C has switched to use the second behavior group 300Y, which contains a combine behavior policy 310B of the active first and second behaviors 300A, 300B (leaving out the inactive third behavior 300C).

Figure 20:
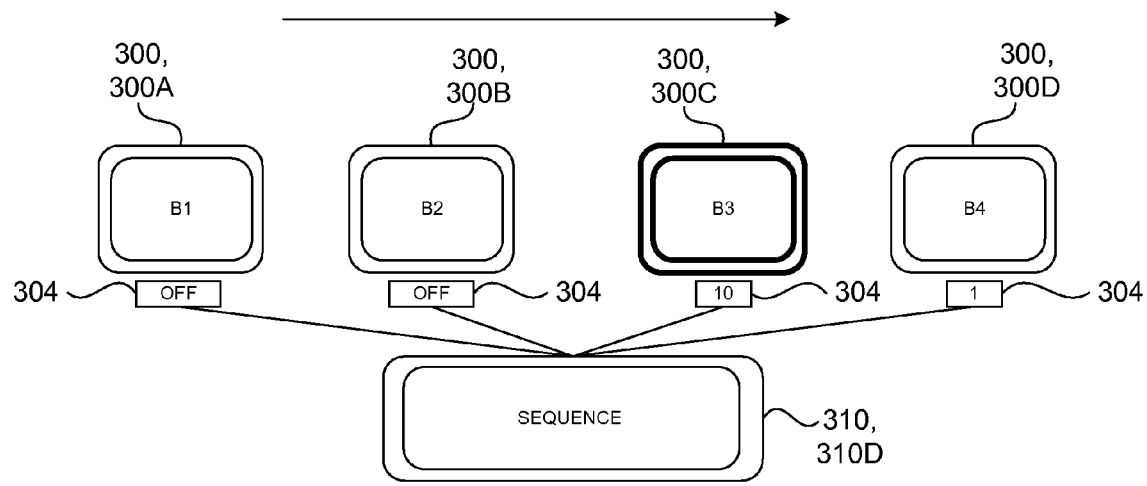
FIG. 20 is a schematic view of a sequence behavior policy.

Referring to FIG. 20, the sequence behavior policy 310D sequentially steps through a set of behaviors 300. The sequence behavior policy 310D will continue to use the first behavior 300 of the set until it is no longer active, at which time the sequence behavior policy 310D uses the next active behavior 300 until it is no longer active, etc. In the example shown, the sequence behavior policy 310D used the first behavior 300A until it was no longer active, stepped to the second behavior 300B and used the second behavior 300B until it was no longer active, and then stepped to the third behavior 300C. The sequence behavior policy 310D will continue to use the third behavior 300C until it is no longer active, at which time it will step to the active fourth behavior 300D.

Referring back to the example shown in FIG. 13, the select behavior policy 310A selects the combine behavior policy 310B, which has a higher behavior weight 304 than the fourth behavior 300D. The combine behavior policy 310B combines the weighted outcome evaluations 460 of the second and third behaviors 300B, 300C. The combined weighted outcome evaluations 460 are further weighted according to the behavior weight 304 of the combine behavior policy 310B. Finally, the resulting outcome evaluations 460 can be weighted further according to the behavior weight 304 of the select behavior policy 310A. The action selection engine 200 selects the outcome 450, from the returned set of weighted outcomes from the select behavior policy 310A, having the highest weighted outcome evaluation 460 as the winning outcome 450.

The robotics system 100 facilitates and allows separate applications 130 to share control of robot resources 122 to effectuate behaviors 300. As mentioned above, the robot manager 150 implements the application priority policy 160 by determining which application 130 has exclusive control of the robot resources 122 required by that application 130 at a given time over other concurrently running applications 130. The applications 130 exclusively claim resources 122 over other concurrently running applications 120 according to the application priority policy 160 provided by the robot manager 150 and communicated to each control arbiter 120.

Figure 21:
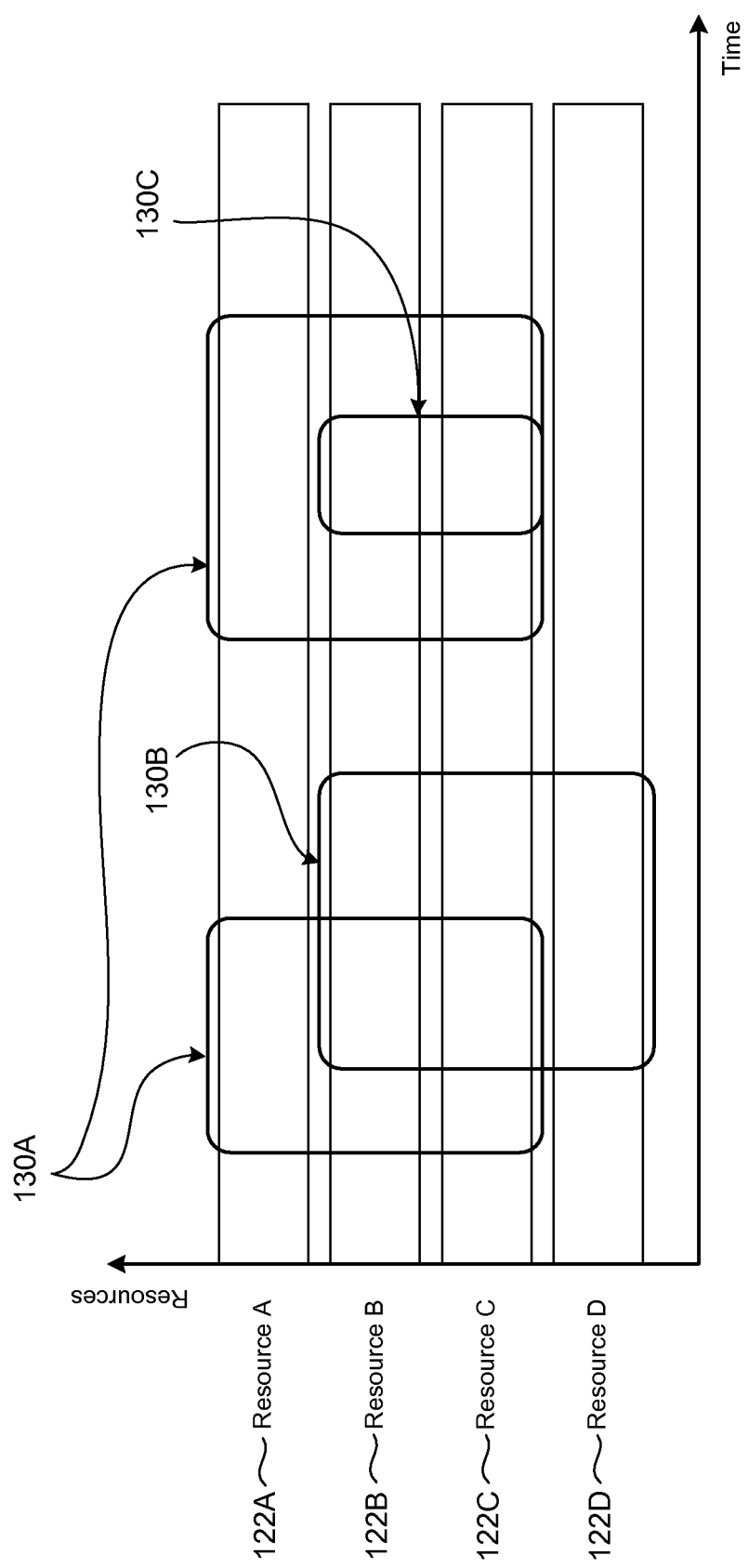
FIG. 21 is a schematic view of multiple applications running on a robotics system.

FIG. 21 illustrates an example of execution of behaviors 300 by the robotics system 100. A first application 130A executing behavior A commands use of a first resource 122A (e.g. flipper), a second resource 122B (e.g. translate), and a third robot resource 122C (e.g. rotate), and a second application 130B executing behavior B commands use of the second resource 122B (e.g. translate), the third robot resource 122C (e.g. rotate), and a fourth robot resource 122D (e.g. turret). The application priority policy, in this example, provides that the first application 130A has priority over the second application 130B. Based on the application priority policy 160, the robot manager 150 allows the first application 130A to use the first, second, and third robot resources 122A, 120B, 120C in executing behavior A to the exclusion of the second application 130B in executing behavior B. However, the robot manager 150 allows the second application 130B to use the fourth resource 122D, which was not otherwise requested by the first application 130A. When the first application 130A has finished executing behavior A, the second application 130B receives control of the freed second and third robot resource 122B, 120C for executing behavior B. As further demonstrated in the example, a third application 130C commands use of the second and third resources 122B, 120C and has priority over the first application 130A. Consequently, when the third application 130C executes behavior C while the first application 130A is executing behavior A, the third application 130C claims control of the necessary robot resources 122 to execute behavior C, which in this example is the second and third resources 122B, 120C. Once the third application 130C has finished executing behavior C, the first application 130A receives control of the freed second and third robot resource 122B, 120C for executing behavior A.

Figure 22:
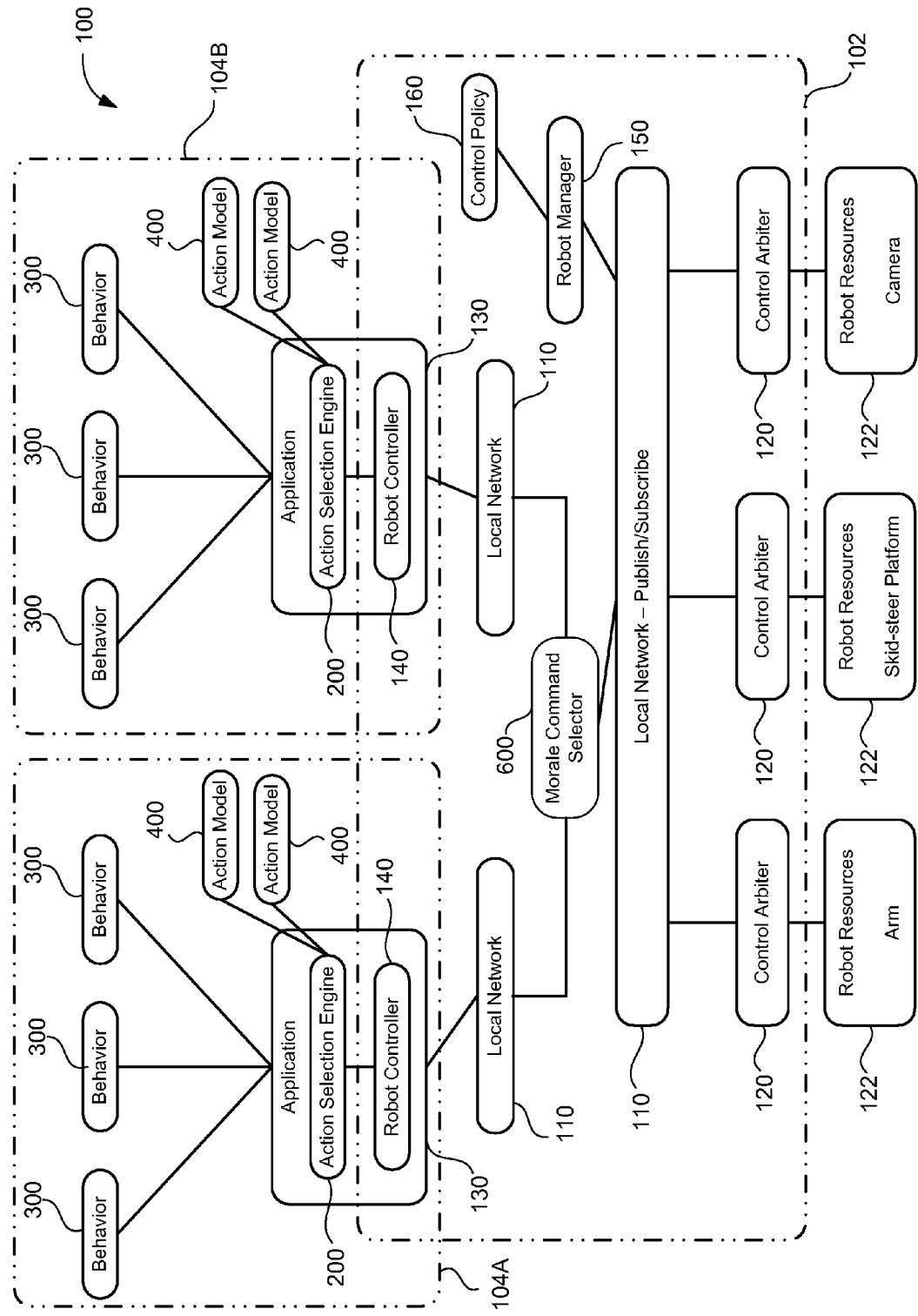
FIG. 22 is a schematic view of a parallel/multi-core scaled robotics system.

Referring to FIG. 22, in a parallel/multi-core scaled robotics system 101, multiple, identical behavior systems 104, 104A, 104B exist on a multi-core computer system 600. Since the action selection engines 200 determine a command 400 in an action space 410 based on randomization, each action selection engine 200, running on a respective parallel network 110, will likely generate a different command 440. Each command 440 has an associated command morale 445, which is a quantification of a residual behavior evaluation for suitability of the command 400. A morale command selector 610 selects the command 440 with the highest associated command morale 445 from a group of commands 440 generated simultaneously by the respective action selection engines 200 running on the parallel networks 110. Although the individual robotics systems 100 are inherently serialized, the randomized search techniques in conjunction with the morale command selector 610 provide linear speed up, resulting in a parallel system that is only limited by memory space and/or bandwidth.

Figure 23:
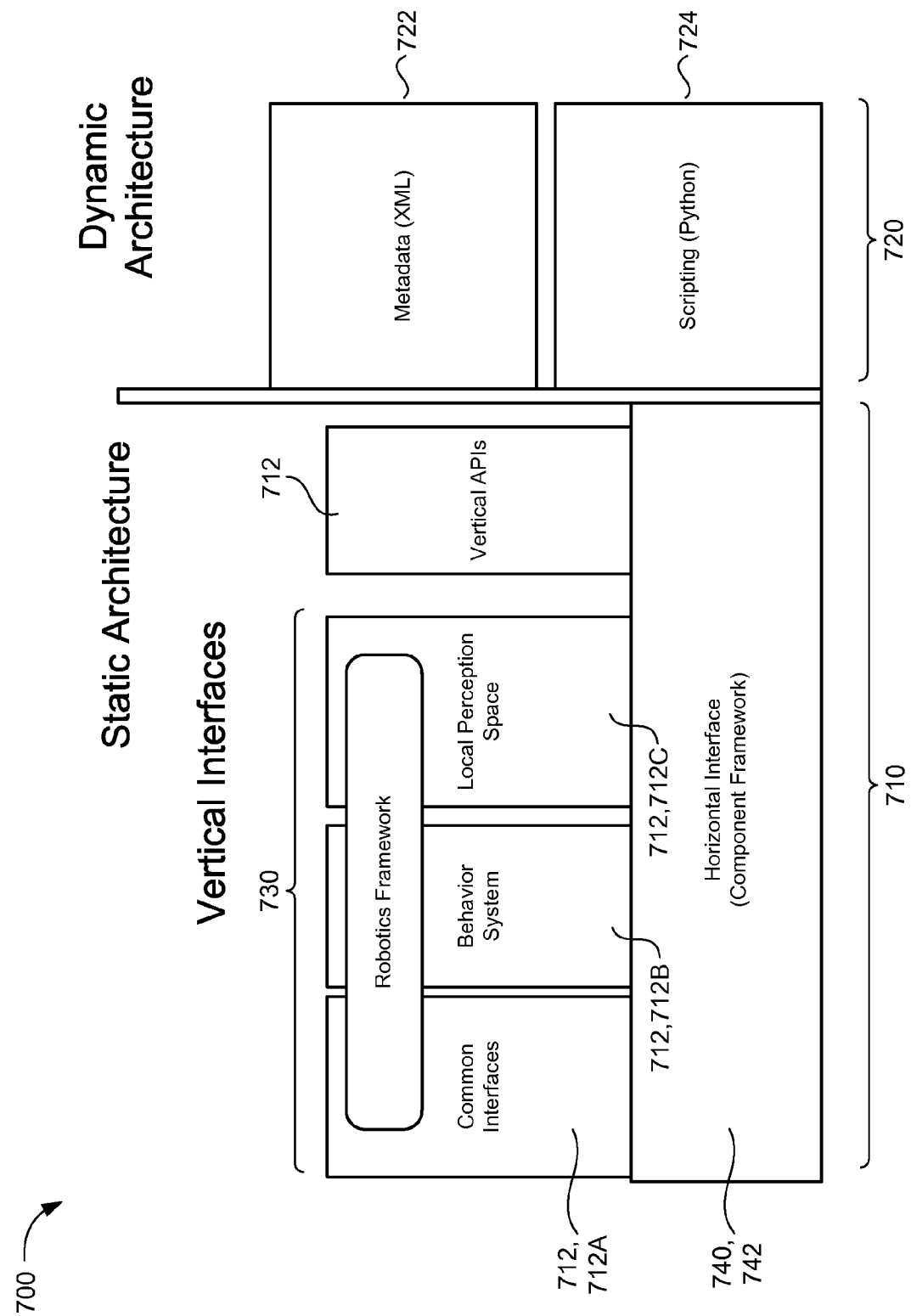
FIG. 23 is a schematic view of a robotics framework.

Referring to FIG. 23, a robotics framework 700 for controlling the robot system 100 includes a static structure 710 in communication with a dynamic structure 720. The static structure 710 includes one or more vertical application programming interfaces (APIs) 712 that provide functionality and performance characteristics of the robot. The APIs 712 of the robotics framework 700 along with other vertical APIs 712 communicate with horizontal interfaces 742, which form a component framework 740. The dynamic structure 720 includes a metadata module 722 (e.g. XML) and a scripting module 724 (e.g. Python). In some implementations, the robotics framework 700 includes a common interfaces API 712A, a behavioral system API 712B, and a local perceptual space API 712C.

The fundamental requirements satisfied by the base framework 700 can include being able to: dynamically create pluggable software components at runtime; dynamically load new pluggable software components at runtime; dynamically configure software component after instantiation as part of creation; and dynamically connect software components as a part of overall configuration. There is complete interface encapsulation so that no implementation instance specific information is seen by clients (insulation for scaling system). The framework may provide support for extensible and modular APIs that can be expanded without breaking existing client code interfaces. The framework may provide support for smooth evolution of new interfaces within the system without breaking existing client code interfaces, as well as support for multiple, different interfaces to the same coherent software component (in support of evolution, modularity and reusability). The framework may maintain metadata about the structure, interfaces and interconnections of running, configured components to support detailed, interactive testing and diagnosis of complex modules. (Called reflection.) The framework may provide usable multithreaded environments and usable in real-time environments, where dynamic reconfiguration is not on a time-critical pathway (i.e. done at startup or in specific system modes). The framework separates concerns into a collection of small interfaces. The principal design pattern used here is an expansion of the common "abstract interface" or "protocol hierarchy[Lakos96]" patterns made popular by the original COM model, but now commonly used in many commercial and open source software systems. There is additional support and stock interfaces for the core functionalities provided in significantly more heavyweight component models such as the (CORBA Component Model) CCM approach, but implemented in C++ language-specific, highly performance conscious manner.

A component is a replaceable part of a system. Examples of components include the robot controller 140, the action selection engine 200, the control arbiters 120, the robot manager 150, the behaviors 300, and the action models 400. It can be readily swapped out and replaced by an equivalent component, without affecting the overall operation of the system. The architecture of the robotics system 100 is based on software components, which can be readily replaced without any reworking or recompiling of the source code. To be replaceable, a software component must conform to a set of required and provided interfaces. In much the same way that a new stereo receiver needs to provide different types of inputs and outputs, so it can be hooked up to older or newer audio-visual components, the interfaces of a software component must be 100-percent compatible with the interfaces of the other components in the system. More specifically, any interfaces that are realized by a software component (i.e., the "provided" interfaces) must remain unchanged, so that other components which use this interface will not have to be changed to remain compliant. Likewise, any interfaces which the component uses to interact with other components (i.e., the "required" interfaces) must also remain unchanged. Components can also have properties, which are used to describe it. For example, a component called "Triangle" would very likely have a property (or set of properties) to specify the coordinates of its 3 vertices.

In the robotics system 100, a component is implemented, for example, as a C++ class which has properties, interfaces, and connections that are compatible with a base framework. Instances of the components can be dynamically loaded and unloaded at runtime. Each instance of a component is able to support a set of named interfaces, which are derived from a common interface class, to support interface navigation by debugging tools.

A property is a specific attribute of a component that is useful in describing it. For example, a component called "Rocket" might have a property called "NumStages", which represents the number of stages of the rocket. A property in the robotics system is specified using the PropertyVar<T> template inside a component definition. For example, since the number of stages in a rocket must be an integer, the "NumStages" property would be declared as such in the Rocket component definition: PropertyVar<unsigned int> NumStages.

An interface is a named set of operations that provide services for other components. For example, a software component which keeps track of appointments might provide an interface that allows another component (such as a calendar) to get a list of appointments and display them on a calendar. In order for the calendar component to access this list of appointments, it must establish a "connection" to the interface provided by the appointment tracker component, and one of the operations provided in that interface must be a method to get the requested appointment data and return it. Thus, one might think of an interface as a means by which components communicate with one another. In the robotics system, an interface is a named API which provides functionality and data, and is implemented, for example, as a C++ class. The interface classes have the additional property that they provide full encapsulation and do not expose implementation details to clients. Examples of interfaces in the robotics system 100 include the robot controller API 142, the behavior API 302, and the action model API 402.

Connections are the wiring that tie components together. While interfaces allow components to talk to one another, interfaces are meaningless if there is no way for one component to specify which other component(s) it wishes to talk to. In order to do this, a component must establish a connection to the required interface. To use a familiar analogy, consider a telephone communications system. In order for two parties to speak with each other on the phone, several things must happen. First, each person must provide an interface for having the conversation. This would be the phone itself, which includes a speaker and microphone for listening and speaking. As long as both parties have a phone, they can talk to each other. However, everyone knows that merely possessing a phone does you little good if you do not know the phone number of the person with whom you wish to speak. That is where connections come in. When you pick up the phone and dial someone's number, you are establishing a connection with them. Once the connection is established, you can talk to each other for as long as the connection is maintained. The robotics system 100 may provide two types of connections: single and multiple. Single connections (specified by the template ConnectionVar<T>) are appropriate when a component needs to access the interface of a single instance of another component. Multiple interface connections (specified by the template MultiConnectionVar<T>) are appropriate when a component needs to access the interface of multiple instances of another component.

Beyond the basic component structure, there may be runtime support in the form of Module and Directory classes. The framework is set up to manage a tree of named component instances that represent the primary functionality of a system. This tree of component instances each support an extensible set of named interfaces. Each instance in the tree is a named instance and has a pathname within the module itself. Object instance names are established by this dynamic instance hierarchy of named instances. Each component instance in the dynamic instance tree can support a connection to the interfaces exported by other instances. This wiring happens at runtime and is used to compose higher-level functionality from components within the system. Usage of framework-based components happens through the explicit interface connection mechanism in this core module and the exported interface header files for the components in question. No sharing of implementation code is required between components that share an interface, however this sharing may be done opportunistically for other reasons.

The base framework defines the interfaces and provides implementations for building reusable, dynamically loadable, dynamically configurable and dynamically connectable, scriptable pieces of performant C++ software. These pieces are called components in the robotics system. The primary means of interface and API definition at the module (executable) level is through the definition of new C++ class interfaces derived from the base framework. The core framework provides the scaffolding for flexible interfaces and evolution of implementation over time for client code. The runtime infrastructure in a Module (process or executable scope) is initialized by accessing the Module instance's interface for the process. The Module interface then provides the root directory holding other instances within the module as well as the basic resource loading functionality. There can be subdirectories within the module and these nest recursively. These objects implement the Directory interface and provide a hierarchical namespace for component instances within process scope. This hierarchical namespace allows modules to be constructed dynamically and organized logically in packages. This naming is provided to support human inspection and understanding of what is going on in a software module and allow a local namespace to be established that refers to object instances. Furthermore, the hierarchical naming can be used to aid programmatic navigation and configuration of the components within a module.

The Module interface can also provide a means to find new factory objects. Each factory instance can create one type of Named object (or Component). When the Module interface searches for a factory instance it may load new dynamic libraries to bring in the needed functionality for the module. The createNew function on the Factory interface returns a new Named interface. The Module interface can also lookup and dynamically load new types from libraries as well, allowing a process to "pick up" the type handling code for a type that was defined after the rest of the process components were deployed.

With a component interface, the individual services and APIs supported by each component are accessed through the Component::get method on the instance. This returns a Named handle to the interface than you can then safely narrow to the specific interface handle type. Once this initial indirection has taken place calls through the new interface operate with the overhead of a virtual function call. When use of the interface is complete, the interface is released by assigning 0 to the handle or allowing the handle to exit scope. The automatic reference counting handles is used to maintain the reference count on component instances.

Note that for each interface type there is a matching reference (handle) type. This reference counting handle is used in the API and provides automatic reference counting support for clients and implementations alike. The reference counting handles can be stored in STL containers, passed as arguments, created on the stack, assigned, returned, etc. and their semantics insures proper reference counting. These reference handles also provide exception safety for the reference counting when used properly. This mechanism can be bypassed, but it is likely to significantly reduce the reference counting reliability of the code.

A number of implementations have been described. Nevertheless, it will be understood that various modifications may be made without departing from the spirit and scope of the disclosure. Accordingly, other implementations are within the scope of the following claims.

What is claimed is:

1. A method performed by one or more processors for generating a command for a robot controller, the method comprising:
    calling at least one action model having at least one action space to generate one or more feasible commands for each action space;
    calling each action model to generate an outcome for each command;
    sending each outcome to at least one behavior for evaluation, each behavior providing an outcome evaluation for each outcome;
    selecting a winning outcome for each action space based on the at least one outcome evaluation;
    selecting the command corresponding to the winning outcome for each action space;
    generating a single overall command based on one or more accumulated commands for each action space; and
    sending the overall command to the robot controller.

2. The method of claim 1, further comprising:
    obtaining a system state from the robot controller; and
    informing each action model and each behavior of the system state.

3. The method of claim 1, wherein calling the action model to generate one or more feasible commands for a first action space comprises executing a heuristic search on the first action space to find the one or more feasible commands.

4. The method of claim 3, wherein the search comprises a hill climbing search technique to search the first action space near a last known command.

5. The method of claim 3, wherein the search comprises a search technique utilizing a command history of the first action space.

6. The method of claim 3, wherein the search comprises a randomized search based on a current command.

7. The method of claim 1, wherein each action model is sequentially called in a predetermined order and each action space within each action model is sequentially called in a predetermined order.

8. The method of claim 7, further comprising considering the winning outcomes of any preceding action spaces when selecting the winning outcome for each action space.

9. The method of claim 1, wherein the outcome evaluations are weighted according to weights associated with each behavior.

10. The method of claim 1, further comprising generating an overall outcome for the overall command, and sending the overall outcome to each behavior as feedback.

11. A method performed by one or more processors for controlling a robot, the method comprising:
    running multiple applications on a processor, each application having a robot controller and an action selection engine, each application being in communication with at least one behavior and at least one action model of at least part of the robot; and
    running periodic action selection cycles on each action selection engine, each action selection cycle comprising:
        selecting a command for each action space of each action model;

generating a single overall command based on the one or more accumulated commands for each action model; and sending the overall command to the robot controller for execution on the robot.

12. The method of claim 11, wherein the action selection cycle further comprises:
obtaining a system state from the robot controller;
informing each action model and each behavior of the system state; and
informing each action model and each behavior of the start of the action selection cycle.

13. The method of claim 11, wherein selecting a command for each action space comprises:
calling the corresponding action model to generate one or more feasible commands for the action space;
calling the corresponding action model to generate outcomes for the one or more feasible commands; and
calling each behavior to evaluate and provide an outcome evaluation for each outcome;
accumulating the outcome evaluations of each behavior;
selecting a winning outcome for the action space; and
selecting the command corresponding to the winning outcome.

14. The method of claim 13, wherein calling the action model to generate one or more feasible commands for the action space comprises executing a heuristic search on the action space to find the one or more feasible commands.

15. The method of claim 14, wherein the search comprises a hill climbing search technique to search the action space near a last known command.

16. The method of claim 14, wherein the search comprises a search technique utilizing a command history of the action space.

17. The method of claim 14, wherein the search comprises a randomized search based on a current command.

18. The method of claim 13, wherein each action model is sequentially called in a predetermined order and each action space within each action model is sequentially called in a predetermined order.

19. The method of claim 18, further comprising considering the winning outcomes of any preceding action spaces when selecting the winning outcome for each action space.

20. The method of claim 13, wherein the outcome evaluations are weighted according to weights associated with each behavior.

21. The method of claim 11, further comprising generating an overall outcome for the overall command, and sending the overall outcome to each behavior as feedback.

22. The method of claim 11, further comprising implementing an application priority policy that determines which application has exclusive control of resources of the robot required by that application at a given time.

* * * * *

UNITED STATES PATENT AND TRADEMARK OFFICE
CERTIFICATE OF CORRECTION

PATENT NO. : 8,452,448 B2  
APPLICATION NO. : 12/100782  
DATED : May 28, 2013  
INVENTOR(S) : Robert T. Pack et al.

It is certified that error appears in the above-identified patent and that said Letters Patent is hereby corrected as shown below:

On Title Page, Item (56), col. 2 (Other Publications), line 1, delete "Oliveria." and insert -- Oliveira. --

In the Claims

In claim 11, col. 37, line 1, after "on" delete "the"

Signed and Sealed this
Twenty-fourth Day of December, 2013

Margaret A. Focarino
*Commissioner for Patents of the United States Patent and Trademark Office*